United States Patent
Matsumura et al.

(10) Patent No.: US 11,729,774 B2
(45) Date of Patent: Aug. 15, 2023

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 53 days.

(21) Appl. No.: 16/644,878

(22) PCT Filed: Sep. 8, 2017

(86) PCT No.: PCT/JP2017/032584
§ 371 (c)(1),
(2) Date: Mar. 5, 2020

(87) PCT Pub. No.: WO2019/049345
PCT Pub. Date: Mar. 14, 2019

(65) Prior Publication Data
US 2020/0288456 A1    Sep. 10, 2020

(51) Int. Cl.
*H04W 72/04*    (2023.01)
*H04W 72/21*    (2023.01)

(52) U.S. Cl.
CPC .................................. *H04W 72/21* (2023.01)

(58) Field of Classification Search
None
See application file for complete search history.

(56) References Cited

U.S. PATENT DOCUMENTS

| | | | |
|---|---|---|---|
| 2013/0100919 A1* | 4/2013 | Han | H04W 16/14 370/329 |
| 2015/0358124 A1 | 12/2015 | Suzuki et al. | |
| 2016/0234833 A1 | 8/2016 | Shimezawa et al. | |
| 2016/0360518 A1* | 12/2016 | Noh | H04L 27/2607 |
| 2018/0006791 A1* | 1/2018 | Marinier | H04L 1/0028 |
| 2019/0098622 A1* | 3/2019 | Lee | H04W 52/367 |

(Continued)

FOREIGN PATENT DOCUMENTS

| | | |
|---|---|---|
| WO | 2014/115781 A1 | 7/2014 |
| WO | 2015/046165 A1 | 4/2015 |

OTHER PUBLICATIONS

ZTE, "Discussion on sPUCCH resource management", Aug. 21-25, 2017, 3GPP TSG RAN WG1 Meeting #90, R1-1712327, pp. 1-7 (Year: 2017).*

(Continued)

*Primary Examiner* — Steve R Young
(74) *Attorney, Agent, or Firm* — Osha Bergman Watanabe & Burton LLP

(57) ABSTRACT

To appropriately notify UL control information in a future radio communication system, a user terminal includes: a transmitting section that transmits an uplink signal by using a code resource associated with a value of uplink control information; and a control section that controls determination of at least one transmission resource of a time resource, a frequency resource and the code resource used for the uplink signal based on indication information that is notified from a radio base station and indicates at least one resource of the time resource, the frequency resource and the code resource.

4 Claims, 14 Drawing Sheets

(56) References Cited

U.S. PATENT DOCUMENTS

2019/0116007 A1\* 4/2019 Yi ................. H04L 27/2607
2019/0380096 A1\* 12/2019 Zhang ............. H04W 52/146

OTHER PUBLICATIONS

International Search Report issued in PCT/JP2017/032584 dated Nov. 14, 2017 (2 pages).
Written Opinion of the International Searching Authority issued in PCT/JP2017/032584 dated Nov. 14, 2017 (3 pages).
ZTE; "Discussion on sPUCCH resource management"; 3GPP TSG RAN WG1 Meeting #90, R1-1712327; Prague, Czech Republic; Aug. 21-25, 2017 (7 pages).
LG Electronics, Intel; "WF on PUCCH time-domain resource indication methods"; 3GPP TSG RAN Meeting #90, R1-1715168; Prague, Czech Republic; Aug. 21-25, 2017 (2 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
3GPP TSG RAN WG1 Meeting #67; R1-113769 "PUCCH enhancement for CoMP" ZTE; San Francisco, USA; Nov. 14-18, 2011 (2 pages).
3GPP TSG RAN WG1 Meeting NR Ad-Hoc#3; R1-1716098 "Short-PUCCH for UCI of up to 2 bits" NTT Docomo, Inc.; Nagoya, Japan; Sep. 18-21, 2017 (16 pages).
3GPP TSG RAN WG1 Meeting #90; R1-1713174 "Design of short NR-PUCCH for up to 2 UCI bits" LG Electronics Prague, Czech Republic; Aug. 21-25, 2017 (6 pages).
Extended European Search Report issued in European Application No. 17924698.8, dated Mar. 15, 2021 (11 pages).
Office Action issued in the counterpart Chinese Patent Application No. 201780096595.7, dated Aug. 29, 2022 (13 pages).
Office Action issued in the counterpart Chinese Patent Application No. 201780096595.7, dated Mar. 18, 2023 (11 pages).

\* cited by examiner

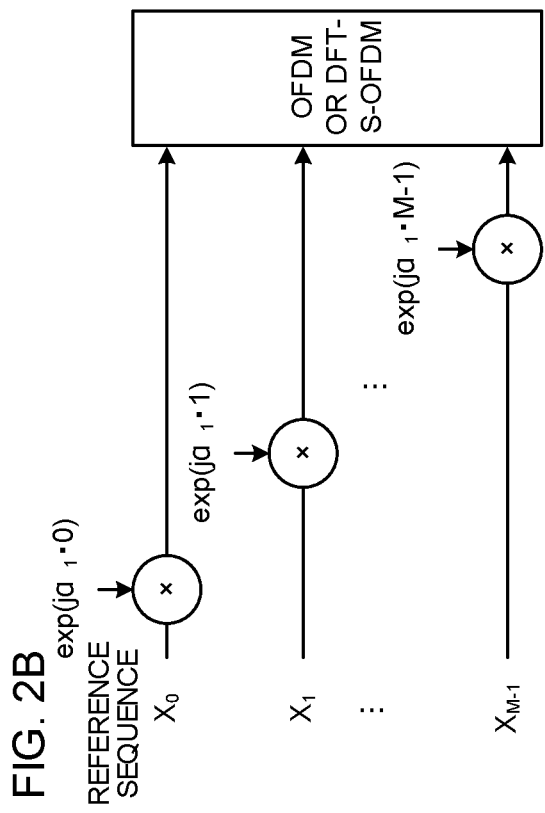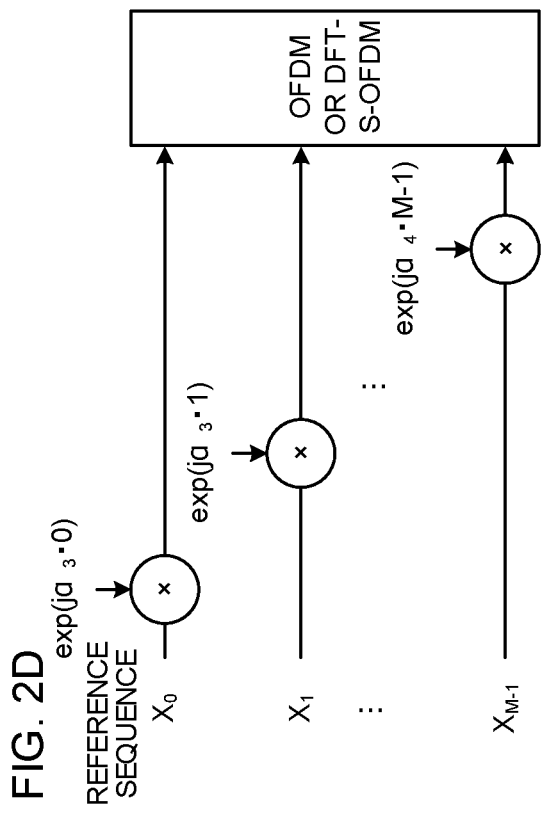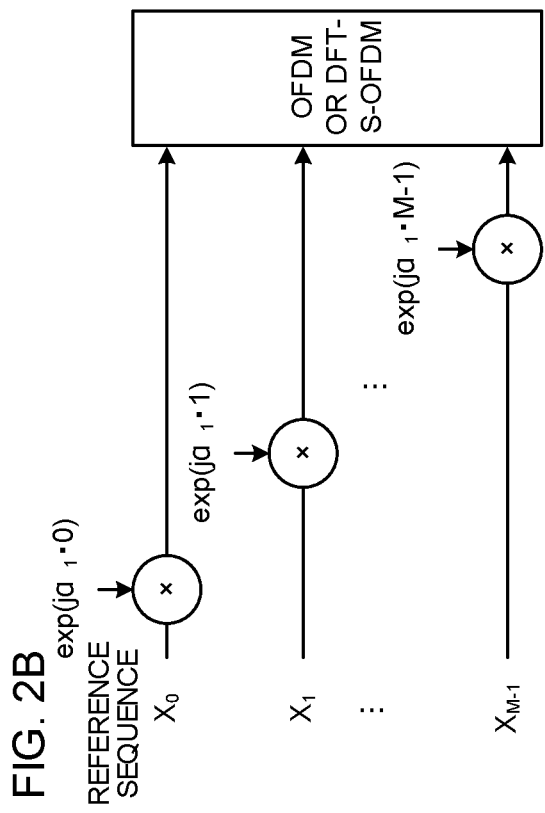

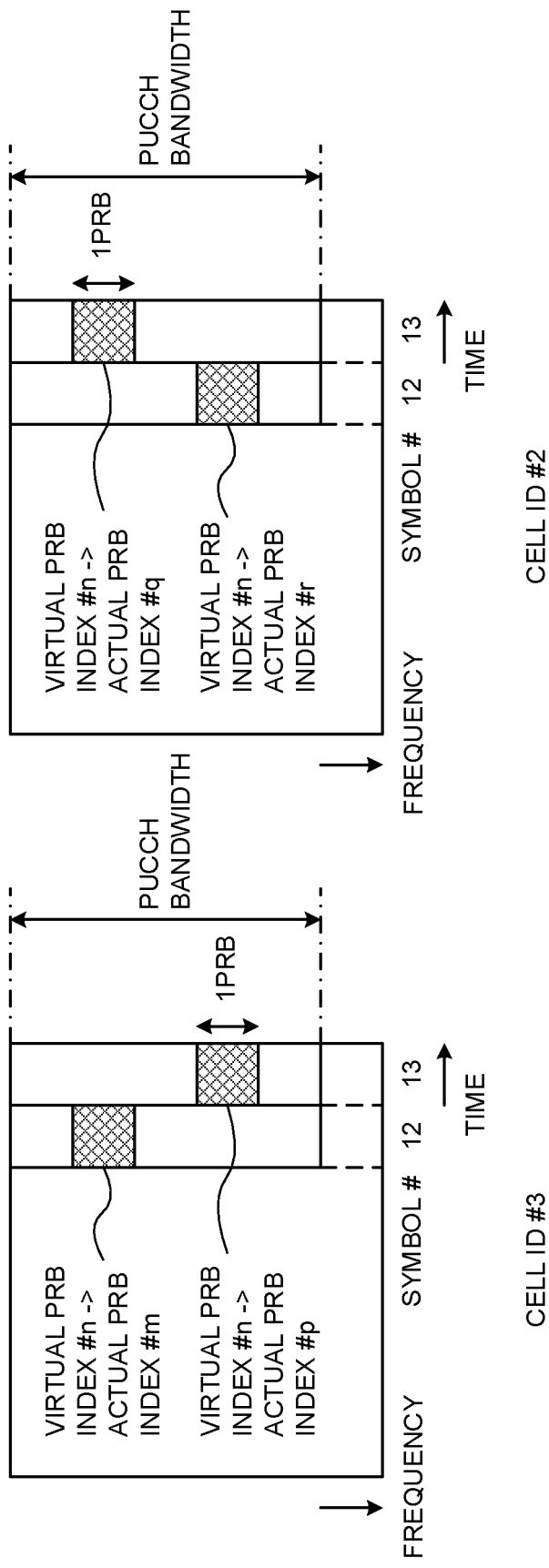

USER TERMINAL AND RADIO COMMUNICATION METHOD

TECHNICAL FIELD

The present invention relates to a user terminal and a radio communication method of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for the purpose of wider bands and a higher speed than those of LTE (also referred to as LTE Rel. 8 or 9), LTE-Advanced (also referred to as LTE-A or LTE Rel. 10, 11 or 12) has been specified. LTE successor systems (also referred to as, for example, Future Radio Access (FRA), the 5th generation mobile communication system (5G), 5G+ (plus), New Radio (NR), New radio access (NX), Future generation radio access (FX) or LTE Rel. 13, 14, 15 or subsequent releases) have been also studied.

Legacy LTE systems (e.g., LTE Rel. 8 to 13) perform communication on Downlink (DL) and/or Uplink (UL) by using a subframe (also referred to as Transmission Time Intervals (TTI)) of 1 ms. The subframe is a transmission time unit of one channel-coded data packet, and is a processing unit of scheduling, link adaptation and retransmission control (HARQ: Hybrid Automatic Repeat reQuest).

Furthermore, according to the legacy LTE systems (e.g., LTE Rel. 8 to 13), a user terminal (UE: User Equipment) transmits Uplink Control Information (UCI) by using a UL control channel (e.g., Physical Uplink Control Channel (PUCCH)) and/or a UL data channel (e.g., Physical Uplink Shared Channel (PUSCH)). The UL control channel configuration (format) will be also referred to as a PUCCH format.

The UCI includes at least one of a Scheduling Request (SR), retransmission control information (also referred to as, for example, Hybrid Automatic Repeat reQuest-Acknowledge (HARQ-ACK), or ACK/Negative ACK (NACK)) for DL data (DL data channel (e.g., PDSCH: Physical Downlink Shared Channel), and Channel State Information (CSI).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

Future radio communication systems (e.g., 5G and NR) are expected to realize various radio communication services while meeting respectively different requirements (e.g., an ultra high speed, a large capacity and ultra low latency).

For example, it has been studied for NR to provide radio communication services that are referred to as enhanced Mobile Broad Band (eMBB), massive Machine Type Communication (mMTC), and Ultra Reliable and Low Latency Communications (URLLC).

Furthermore, it has been studied for LTE/NR to use various UL control channel configurations (UL control channel formats). These future radio communication systems have a risk that application of a UCI transmission method of legacy LTE systems (LTE Rel. 13 or prior releases) deteriorates a coverage and/or a throughput.

The present invention has been made in light of this point, and one of objects of the present invention is to provide a user terminal and a radio communication method that can appropriately notify UL control information in a future radio communication system.

Solution to Problem

A user terminal according to one aspect of the present invention includes: a transmitting section that transmits an uplink signal by using a code resource associated with a value of uplink control information; and a control section that controls determination of at least one transmission resource of a time resource, a frequency resource and the code resource used for the uplink signal based on indication information that is notified from a radio base station and indicates at least one resource of the time resource, the frequency resource and the code resource.

Advantageous Effects of Invention

According to the present invention, it is possible to appropriately notify UL control information in a future radio communication system.

BRIEF DESCRIPTION OF DRAWINGS

FIGS. 2A to 2D are diagrams illustrating one example of transmission signal generating processing for the sequence-based PUCCH.

FIGS. 3A and 3B are diagrams illustrating one example of two actual PRB indices that can be obtained from an identical virtual PRB index.

DESCRIPTION OF EMBODIMENTS

Figure 1B:
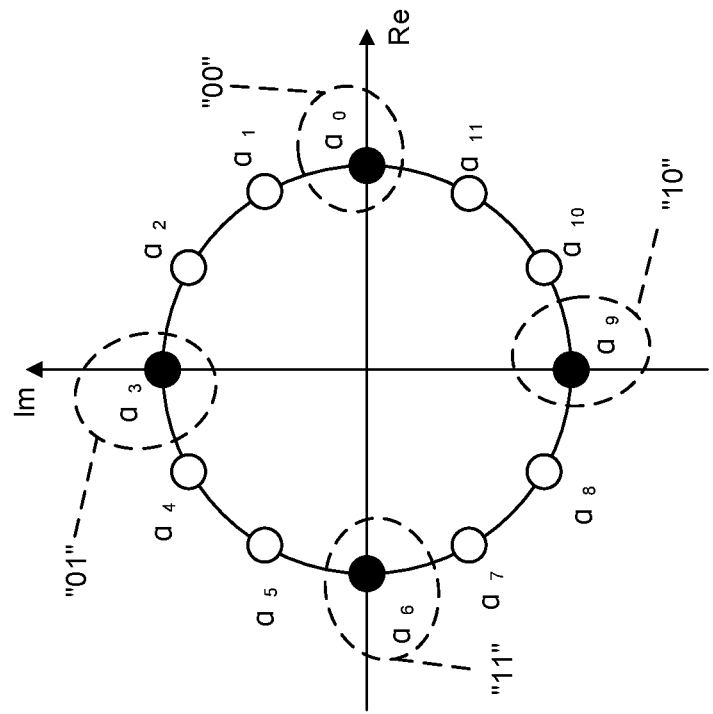
FIGS. 1A and 1B are diagrams illustrating one example of a sequence-based PUCCH.

It has been studied for future radio communication systems (e.g., LTE Rel. 14, 15 and subsequent releases, 5G and NR) to introduce a plurality of numerologies instead of a single numerology.

In addition, the numerologies may mean a communication parameter set that characterizes a signal design of a certain Radio Access Technology (RAT) or an RAT design or may be parameters such as a SubCarrier-Spacing (SCS), a symbol length, a cyclic prefix length and a subframe length related to a frequency direction and/or a time direction.

Furthermore, as a plurality of numerologies are supported, it has been studied for the future radio communication systems to introduce identical and/or different time units (also referred to as, for example, a subframe, a slot, a mini slot, a subslot, a Transmission Time Interval (TTI), a short TTI (sTTI) and a radio frame) to and from those of legacy LTE systems (LTE Rel. 13 and prior releases).

In addition, the TTI may represent a time unit at which a transport block, a code block and/or a codeword of transmission/received data are transmitted and received. When the TTI is given, a time period (the number of symbols) in which the transport block, the code block and/or the codeword of data are actually mapped may be shorter than the TTI.

When, for example, the TTI includes a given number of symbols (e.g., 14 symbols), the transport block, the code block and/or the codeword of transmission/received data may be transmitted and received in 1 to a given number of symbol periods of the symbols. When the number of symbols for transmitting and receiving the transport block, the code block and/or the codeword of the transmission/received data is smaller than the number of symbols in the TTI, a reference signal and a control signal can be mapped on symbols on which data is not mapped in the TTI.

A subframe may be a time unit having a given time duration (e.g., 1 ms) irrespectively of numerologies used by (and/or configured to) a user terminal (e.g., UE: User Equipment).

On the other hand, a slot may be a time unit based on the numerologies used by the UE. When, for example, a subcarrier-spacing is 15 kHz or 30 kHz, the number of symbols per slot may be 7 or 14 symbols. When the subcarrier-spacing is 60 kHz or more, the number of symbols per slot may be 14 symbols. Furthermore, the slot may include a plurality of mini slots.

It has been studied for these future radio communication systems to support a UL control channel (also referred to as a short PUCCH below) of a shorter duration than that of a Physical Uplink Control Channel (PUCCH) format of the legacy LTE systems (e.g., LTE Rel. 8 to 13), and/or a UL control channel (also referred to as a long PUCCH below) of a longer duration than the shorter duration.

The short PUCCH (a short PUCCH or a shortened PUCCH) includes a given number of symbols (e.g., 1, 2 or 3 symbols) in a certain SCS. On the short PUCCH, Uplink Control Information (UCI) and a Reference Signal (RS) may be subjected to Time Division Multiplexing (TDM) or may be subjected to Frequency Division Multiplexing (FDM). The RS may be, for example, a DeModulation Reference Signal (DMRS) used to demodulate the UCI.

An SCS of each symbol of the short PUCCH may be identical to or higher than an SCS of a data channel symbol (also referred to as a data symbol below). A data channel may be, for example, a downlink data channel (PDSCH: Physical Downlink Shared Channel) or an uplink data channel (PUSCH: Physical Uplink Shared Channel).

Hereinafter, the simple expression "PUCCH" may be read as a "short PUCCH" or a "PUCCH in short duration".

The PUCCH may be subjected to TDM and/or FDM with a UL data channel (also referred to as a PUSCH below) in a slot. Furthermore, the PUCCH may be subjected to TDM and/or FDM with a DL data channel (also referred to as a PDSCH below) and/or a DL control channel (also referred to as a PDCCH: Physical Downlink Control Channel below) in a slot.

As short PUCCH transmission schemes, a DMRS-based PUCCH (DMRS-based transmission or a DMRS-based PUCCH) for notifying UCI by transmitting a UL signal obtained by performing FDM and/or TDM on the DMRS and the UCI, and a sequence-based PUCCH (sequence-based transmission or a sequence-based PUCCH) for notifying UCI by transmitting a UL signal that uses a code resource associated with a UCI value without using a DMRS have been studied.

The DMRS-based PUCCH transmits the PUCCH including an RS for demodulating the UCI, and therefore may be referred to as coherent transmission or a coherent design. The sequence-based PUCCH notifies the UCI by using the PUCCH that does not include the RS for demodulating the UCI, and therefore may be referred to as non-coherent transmission or a non-coherent design.

It has been studied to map a sequence whose sequence length is 12 on 12 contiguous Resource Elements (REs) in a Physical Resource Block (PRB) for 1 symbol short PUCCH for UCI up to 2 bits. Sequences whose sequence lengths are 24 and 48 are may be used. The sequence-based PUCCH and another sequence may be multiplexed by using Code Division Multiplexing (CDM) or FDM.

The code resource for the sequence-based PUCCH is a resource that can be subjected to Code Division Multiplexing, and may be at least one of a reference sequence, a cyclic shift amount (phase rotation amount) and an Orthogonal Cover Code (OCC). The cyclic shift may be read as phase rotation.

Information related to at least one of a time resource, a frequency resource and a code resource for a sequence-based PUCCH may be notified from a Network (the NW such as a base station or a gNodeB) to the UE by a higher layer signaling (e.g., a Radio Resource Control (RRC) signaling, a Medium Access Control (MAC) signaling, and broadcast information (e.g., a Master Information Block (MIB) or a System Information Block (SIB)), a physical layer signaling (e.g., DCI) or a combination of these signalings.

The reference sequence may be a Constant Amplitude Zero Auto-Correlation (CAZAC) sequence (e.g., Zadoff-chu sequence), or may be a sequence (Computer Generated CAZAC (CG-CAZAC) sequence) equivalent to the CAZAC sequence given by 3GPP TS 36.211 § 5.5.1.2 (Table 5.5.1.2-1 and Table 5.5.1.2-2 in particular). The number of reference sequences is, for example, 30.

A case where the sequence-based PUCCH transmits 2-bit UCI by using a Cyclic Shift (CS) will be described. The cyclic shift may be expressed as a phase rotation amount, and therefore may be paraphrased as the phrase rotation amount. A plurality of cyclic shift amount (phase rotation amount) candidates to be allocated to one UE will be referred to as a CS candidate set (a cyclic shift amount set, a cyclic shift amount pattern, a phase rotation amount candidate set and a phase rotation amount pattern).

Figure 1A:
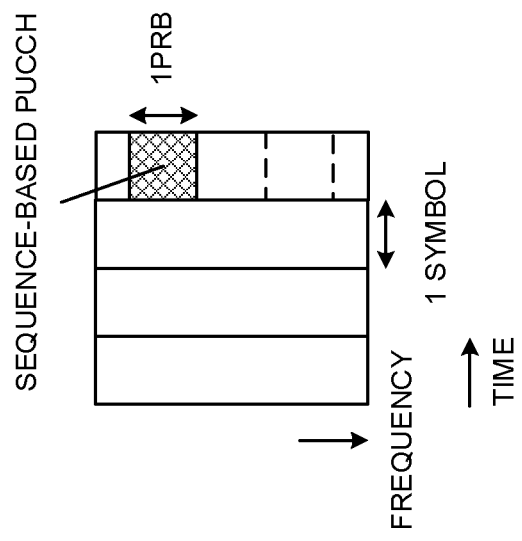
Figure 12:
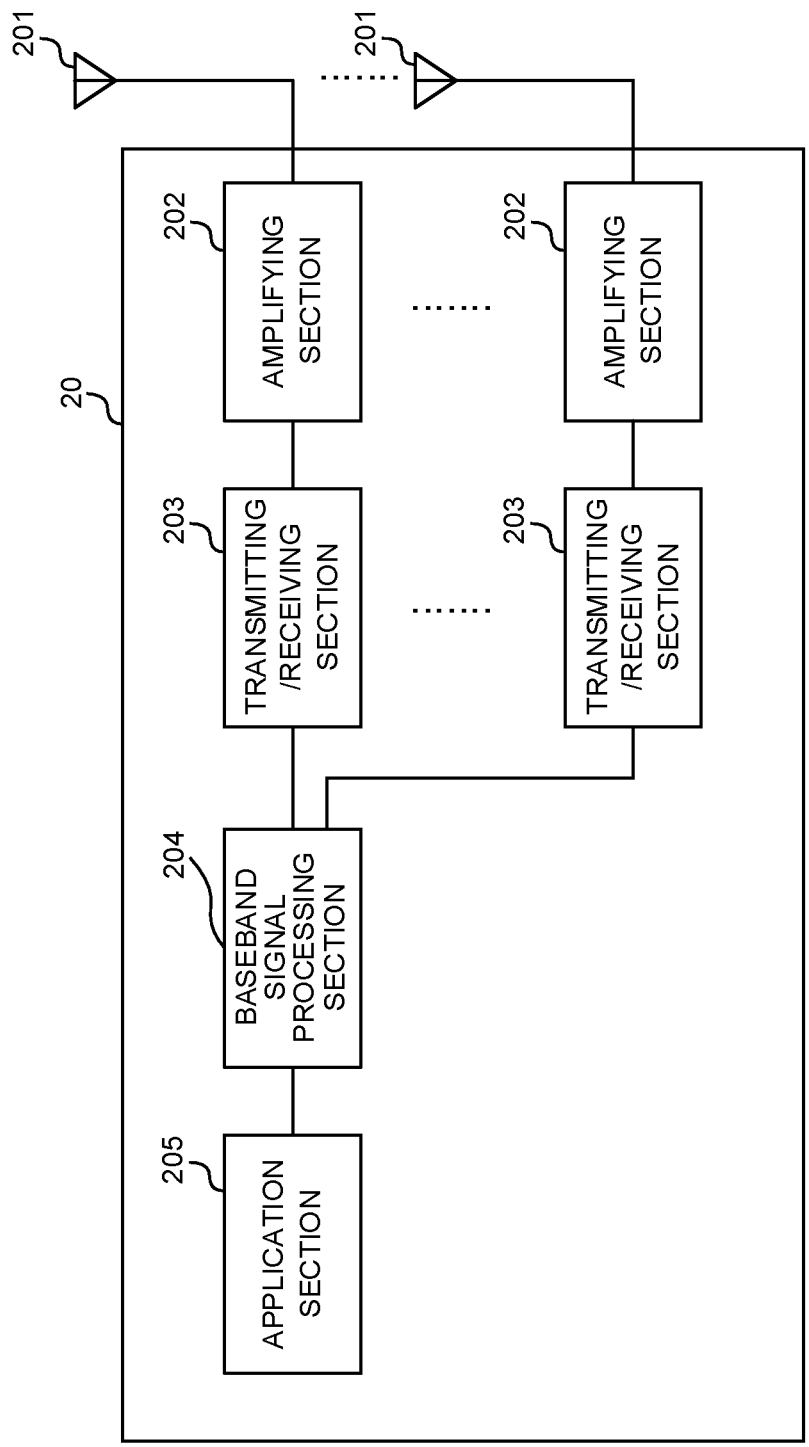
FIG. 12 is a diagram illustrating one example of an overall configuration of a user terminal according to the one embodiment of the present invention.

The sequence length of the reference sequence is determined based on a number of subcarriers M and the number of Physical Resource Blocks (PRBs). As illustrated in FIG. 1A, when the sequence-based PUCCH is transmitted by using a band of 1 PRB, the sequence length of the reference sequence is 12 (=12×1). In this case, as illustrated in FIG. 1B, 12 phase rotation amounts $\alpha_0$ to $\alpha_{11}$ having a phase interval of $2\pi/12$ (i.e., $\pi/6$) are defined. 12 sequences that can be obtained by performing phrase rotation (cyclic shift) on one reference sequence by using the phase rotation amounts $\alpha_0$ to $\alpha_{11}$ are orthogonal to each other (a cross-correlation becomes 0). In addition, the phase rotation amounts $\alpha_0$ to $\alpha_{11}$ may be defined based on at least one of the number of subcarriers M, the number of PRBs and the sequence length of the reference sequence. The cyclic shift candidate set may include 2 or more phase rotation amounts selected from the phase rotation amounts $\alpha_0$ to $\alpha_{11}$.

The sequence-based PUCCH notifies control information including at least one of ACK/NACK (A/N), CSI and an SR. In addition, UCI indicating A/N and/or CSI, and a positive SR may be referred to as UCI including the SR, and the UCI indicating A/N and/or the CSI, and a negative SR may be referred to as UCI that does not include the SR. In the following description, control information indicating A/N and/or the CSI will be referred to as UCI, and control information indicating the positive SR or the negative SR will be referred to as a positive/negative SR.

When, for example, the UCI is 1 bit, UCI values 0 and 1 may be associated with "NACK" and "ACK", respectively. When, for example, the UCI is 2 bits, the UCI values 00, 01, 11 and 10 may be associated with "NACK-NACK", "NACK-ACK", "ACK-ACK" and "ACK-NACK", respectively.

When, for example, the UCI is 2 bits as illustrated in FIG. 1B, the UE performs phase rotation on the reference sequence by using a phase rotation amount associated with a value to be transmitted among four candidates of the 2-bit UCI values, and transmits the signal subjected to the phase rotation by using the given time/frequency resources. The time/frequency resources are a time resource (e.g., a subframe, a slot or a symbol) and/or a frequency resource (e.g., a carrier frequency, a channel band, a Component Carrier (CC) or a PRB).

FIG. 2 is a diagram illustrating one example of transmission signal generating processing for the sequence-based PUCCH. The transmission signal generating processing performs phrase rotation (cyclic shift) on reference sequences $X_0$ to $X_{M-1}$ of a sequence length M by using the selected phase rotation amount $\alpha$, and inputs the reference sequences subjected to the phase rotation to an Orthogonal Frequency Division Multiplexing (OFDM) transmitter or a Discrete Fourier Transform-Spread-Orthogonal Frequency Division Multiplexing (DFT-S-OFDM) transmitter. The UE transmits an output signal from the OFDM transmitter or the DFT-S-OFDM transmitter.

When UCI information candidates 0 to 3 are associated with phase rotation amount candidates $\alpha_0$ to $\alpha_3$, respectively, and information 0 is notified as the UCI, the UE performs phase rotation on the reference sequences $X_0$ to $X_{M-1}$ by using the phase rotation amount $\alpha_0$ associated with the information 0 as illustrated in FIG. 2A. Similarly, when the pieces of information 1 to 3 are notified as the UCI, the UE performs phase rotation on the reference sequences $X_0$ to $X_{M-1}$ by using the phase rotation amounts $\alpha_1$, $\alpha_2$ and $\alpha_3$ associated with the pieces of information 1 to 3 as illustrated in FIGS. 2B, 2C and 2D.

Next, decoding of the UCI notified by the sequence-based PUCCH will be described. Hereinafter, a reception decision operation in a case where the UCI is notified by selecting a phase rotation amount will be described. However, the same applies to a case where the UCI is notified by selecting another type of a resource (e.g., the reference sequence or the time/frequency resources) or a combination of a plurality of types of resources.

The NW may decide the UCI by using Maximum Likelihood Detection (that may be referred to as MLD or correlation detection) from the received signal. More specifically, the network may generate a replica (phase rotation amount replica) of each phase rotation amount allocated to the user terminal (i.e., generate phase rotation amount replicas of 4 patterns when, for example, a UCI payload length is 2 bits), and generate a transmission signal waveform similar to the user terminal by using the reference sequence and the phase rotation amount replica. Furthermore, the network may calculate for all phase rotation amount replicas a correlation between the obtained transmission signal waveform and a received signal waveform received from the user terminal, and estimate that the phase rotation amount replica of the highest correlation has been transmitted.

More specifically, the network may multiply each element of a received signal sequence (M complex sequences) of a size M after DFT with a complex conjugate of transmission signal sequences (M complex sequences) obtained by performing phase rotation of a phase rotation amount replica on the reference sequence of the transmission signal, and assume that a phase rotation amount replica that maximizes an absolute value (or a square of the absolute value) of a total of the obtained M sequences has been transmitted.

Furthermore, the network may generate transmission signal replicas the number of which corresponds to a maximum allocation number (12 in a case of 1 PRB) of the phase rotation amount, and estimate a phase rotation amount having the highest correlation with the received signal by the same operation as that of the above MLD. When the phase rotation amount other than the allocated phase rotation amounts is estimated, the network may estimate that the phase rotation amount closest to the estimated phase rotation amount among the allocated phase rotation amounts has been transmitted.

The base station decides a UCI value and a positive/negative SR by performing MLD on, for example, the received sequence-based PUCCH.

To use the sequence-based PUCCH, the NW needs to configure resource numbers associated with UCI candidate values to the UE. When the UCI is 1 bit, the number of the resource numbers is two. When the UCI is 2 bits, the number of resource numbers is four. Each bit of the UCI indicates, for example, ACK or NACK.

The resource number may be a symbol number and/or a slot number indicating a time resource of the sequence-based PUCCH. The resource number may be a PRB index indicating a frequency resource of the sequence-based PUCCH. The resource number may be a sequence number (sequence index) indicating the reference sequence used for the sequence-based PUCCH. When the sequence length of the reference sequence is 12, the sequence number may indicate any one of 0 to 29. The resource number may be a CS index used for the sequence-based PUCCH. When the sequence length of the reference sequence is 12, the CS index may indicate any one of 0 to 11. The number of CS indices that can be used for the sequence-based PUCCH may be restricted.

The number, the index, the identifier and the identification information can be paraphrased with each other.

It is assumed to use a reference sequence whose cross-correlation between sequences is little as described above for the sequence-based PUCCH. By using difference reference sequences (sequence numbers) between a certain cell and surrounding cells of the certain cell, it is possible to reduce an inter-cell interference.

However, when the same PRB, the same reference sequence and the same CS are used for the sequence-based PUCCH between the certain cell and the surrounding cells of the certain cell, the inter-cell interference occurs. When the inter-cell interference occurs, it is not possible to correctly notify UCI by the PUCCH of 1 symbol in some cases.

Hence, the inventors of this application have studied a method for preventing contention between resources (at least one of time resources, frequency resources and code resources) used for the sequence-based PUCCH, and invented the present invention.

The embodiments according to the present invention will be described in detail below with reference to the drawings. A radio communication method according to each embodiment may be each applied alone or may be applied in combination.

(Radio Communication Method)

First Embodiment

According to the first embodiment, a UE determines a frequency resource of a sequence-based PUCCH based on a parameter notified from an NW. For example, the frequency resource is indicated by a PRB index.

Hereinafter, the PRB index notified from the NW to the UE will be referred to as a virtual PRB index, and the PRB index indicating a PRB used to transmit an actual sequence-based PUCCH will be referred to as an actual PRB index. When the sequence-based PUCCH uses a plurality of PRBs, the PRB index may be minimum and/or maximum, or center PRB indices.

The UE determines an actual PRB index from the virtual PRB index using a given calculation formula. The calculation formula may use at least one of parameters such as a cell ID, a PRB index, a slot index, a symbol index, a sequence index, a CS index, a CS candidate set index, a Control Channel Element (CCE) index of a PDCCH, an HARQ process ID, and a resource index of the PDSCH corresponding to A/N to be transmitted on a PUCCH. When the resource index of the PDSCH includes a range, this resource index may be minimum and/or maximum resource indices.

The parameters may be explicitly or implicitly notified from the NW to the UE by a higher layer signaling (e.g., an RRC signaling or broadcast information) and/or a physical layer signaling.

Furthermore, the parameter may include or may not include a UE ID. The calculation formula may be defined according to whether or not UE multiplexing is performed. The UE multiplexing described herein refers to that sequence-based PUCCHs of different UEs in an identical cell are multiplexed in a CS domain of an identical time resource and an identical frequency resource. When UE multiplexing is performed, the NW notifies the different UEs in the identical cell of different CS candidate sets for UE multiplexing.

When, for example, UE multiplexing is performed, the calculation formula may not use the UE ID. This is because using the UE ID makes actual PRB indices of a plurality of UEs in the identical cell identical in some cases. When, for example, UE multiplexing is not performed, the calculation formula may use the UE ID. By using the UE ID, it is possible to randomize the actual PRB indices, and reduce an inter-cell interference.

A virtual parameter that is notified from the NW to the UE, and an actual parameter that is actually used may be defined for each of these parameters. In this case, a PRB index calculation formula may use the virtual parameter or may use the actual parameter.

In, for example, the calculation formula, the actual PRB index is (virtual PRB index×cell ID×slot index×symbol index) mod (number of PRBs of PUCCH bandwidth).

The PUCCH bandwidth includes a plurality of PRBs, and may be part of a UE transmission bandwidth. The sequence-based PUCCH uses PRBs indicated by actual PRB indices of the PUCCH bandwidth. A band of the UE transmission bandwidth other than the PUCCH bandwidth may be used to transmit a data channel (e.g., a PUSCH). The PUCCH bandwidth includes a plurality of PRBs, and may be equal to the UE transmission bandwidth.

The NW also determines the actual PRB indices by using the same calculation formula as that of the UE, so that the NW and the UE can determine the identical actual PRB indices.

FIGS. 3A and 3B are diagrams illustrating one example of two actual PRB indices that can be obtained from an identical virtual PRB index. In this example, the virtual PRB index is n, a slot index is 1, and symbol indices are 12 and 13. In this example, although the sequence-based PUCCH is transmitted over 2 symbols, the UE can determine the actual PRB indices likewise even in a case of sequence-based PUCCHs having other time durations such as 1 symbol.

In addition, FIGS. 3 to 5, 7 and 8 illustrate examples of transmission of a PUCCH including 1 PRB. However, a PUCCH may include a plurality of PRBs (e.g., 2 PRBs, 3 PRBs or 4 PRBs). In this case, virtual PRB indices and actual PRB indices may represent minimum/maximum/center PRB indices of the PUCCH to be transmitted. The UE may assume that the number of PRBs of the PUCCH to be transmitted is notified by a higher layer signaling (e.g., an RRC signaling or broadcast information), or is defined in advance by a specification. Furthermore, although it is possible to assume that virtual PRB indices to be notified are #0, #2, #4, #6 and . . . when, for example, a PUCCH including 2 PRBs is assumed, the NW may notify values of #0, #1, #2 and #3 in this case, and the UE may calculate the virtual PRB index according to (notified values)×(number of PRBs of PUCCH).

When a cell ID is 3 as illustrated in FIG. 3A, m can be obtained as an actual PRB index of a symbol #12, and p can be obtained as an actual PRB index of a symbol #13 according to the calculation formula.

When a cell ID is 2 as illustrated in FIG. 3B, q can be obtained as an actual PRB index of the symbol #12, and r can be obtained as an actual PRB index of the symbol #13 according to the calculation formula.

The calculation formula uses the cell ID, so that, even when the virtual PRB index, the slot index and the symbol index are identical, it is possible to obtain different actual PRB indices from different cell IDs.

The UE uses this calculation formula, so that, even when sequence-based PUCCHs of a certain cell and surrounding cells use an identical reference sequence and an identical CS, it is possible to randomize PRBs of the sequence-based PUCCHs, suppress a probability of occurrence of an inter-cell interference, and improve communication quality.

There is a case where an identical PRB index is allocated to sequence-based PUCCHs of different cells. The UE uses the calculation formula by using the allocated PRB index as a virtual PRB index, so that it is possible to reduce a probability that actual PRB indices of the sequence-based PUCCHs become identical between a certain cell and surrounding cells of the certain cell compared to a case where the NW allocates PRB indices.

<<Case where a Plurality of Calculation Formulae are Defined>>

A plurality of calculation formulae for calculating actual PRB indices from a virtual PRB index may be defined. In this case, instruction information that indicates which one of calculation formulae is used may be notified from the NW to the UE by a higher layer signaling (e.g., an RRC signaling or broadcast information).

For example, following two calculation formulae are defined.

A first calculation formula includes a symbol index. According to, for example, the first calculation formula, the actual PRB index is (virtual PRB index×cell ID×slot index×symbol index) mod (number of PRBs of PUCCH bandwidth).

A second calculation formula does not include a symbol index. In, for example, the second calculation formula, the actual PRB index is (virtual PRB index×cell ID×slot index) mod (number of PRBs of PUCCH bandwidth).

Figure 4A:
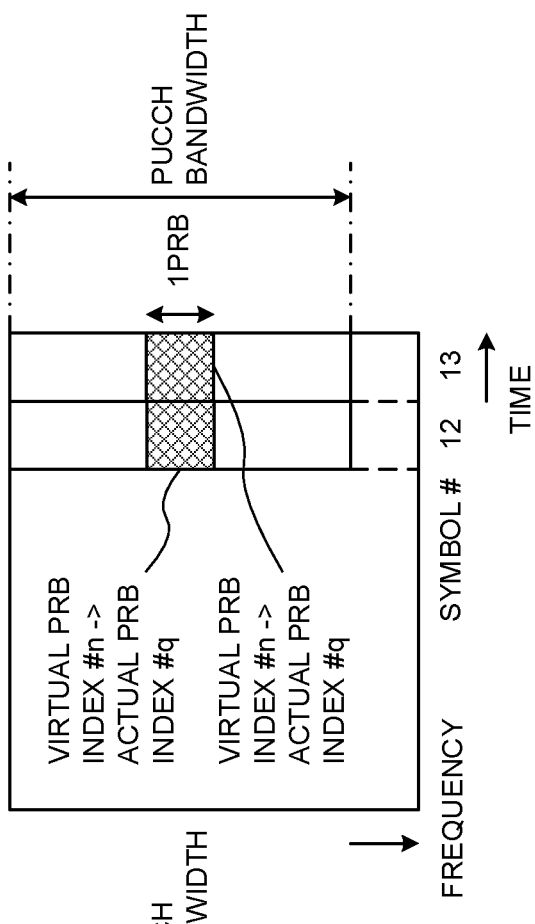
FIGS. 4A and 4B are diagrams illustrating one example of actual PRB indices that can be obtained from two calculation formulae.
Figure 4B:
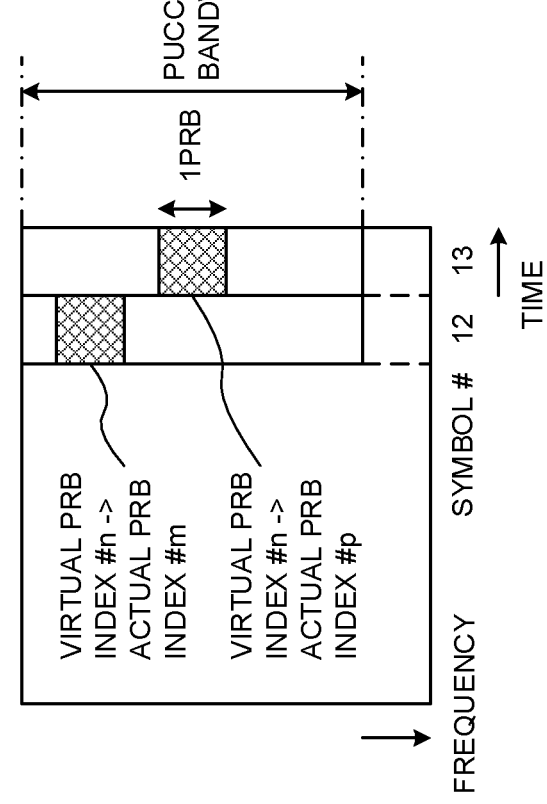

FIGS. 4A and 4B are diagrams illustrating one example of actual PRB indices that can be obtained from the two calculation formulae.

When the first calculation formula is used as illustrated in FIG. 4A, m can be obtained as the actual PRB index of the symbol #12, and p can be obtained as the actual PRB index of the symbol #13. That is, the different actual PRB indices can be obtained for different symbols. According to this first calculation formula, the UE performs frequency hopping per symbol in a sequence-based PUCCH.

When the second calculation formula is used as illustrated in FIG. 4B, q can be obtained as the actual PRB index of the symbol #12, and q can be obtained as the actual PRB index of the symbol #13. That is, an identical actual PRB index can be obtained for different symbols. According to this second calculation formula, the UE does not perform frequency hopping in the sequence-based PUCCH.

According to this operation, by switching between the first calculation formula and the second calculation formula according to the instruction information, the UE can switch between activation and deactivation of frequency hopping.

Furthermore, by using the first calculation formula, it is possible to determine actual PRB indices of all symbols in the sequence-based PUCCH without notifying information (a hopping pattern or a hopping offset) indicating PRB indices of all symbols in the sequence-based PUCCH, and consequently it is possible to suppress a notification overhead for configuring frequency hopping.

A calculation formula for increasing a diversity gain may be defined.

For example, the first calculation formula may be classified depending on cases according to a symbol index.

When the symbol index is an odd number, an actual PRB index is (virtual PRB index×cell ID×slot index×symbol index) mod (number of PRBs of PUCCH bandwidth) in the first calculation formula.

When the symbol index is an even number, an actual PRB index is (number of PRBs of PUCCH bandwidth−1)−{(virtual PRB index×cell ID×slot index×symbol index) mod (number of PRBs of PUCCH bandwidth)} in the first calculation formula.

Figure 5A:
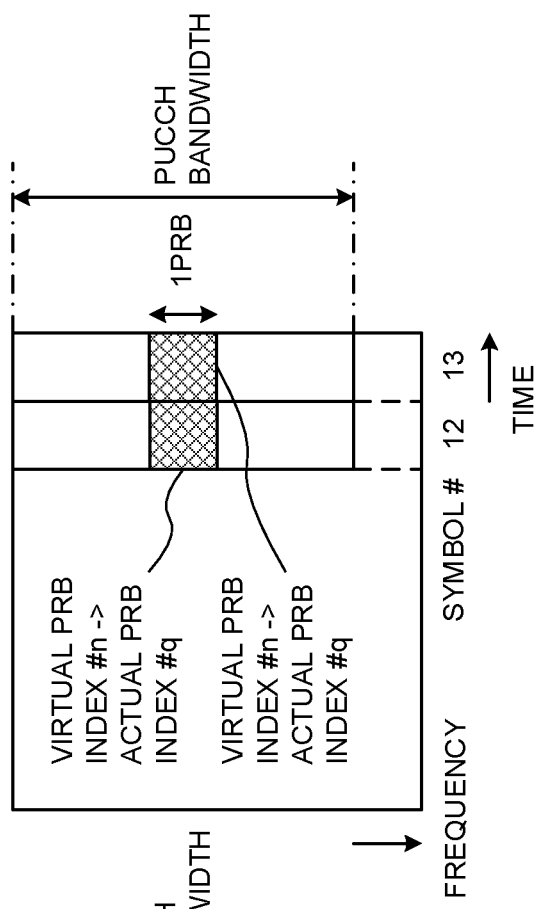
FIGS. 5A and 5B are diagrams illustrating one example of actual PRB indices that can be obtained from the calculation formulae for improving a frequency diversity gain.
Figure 5B:
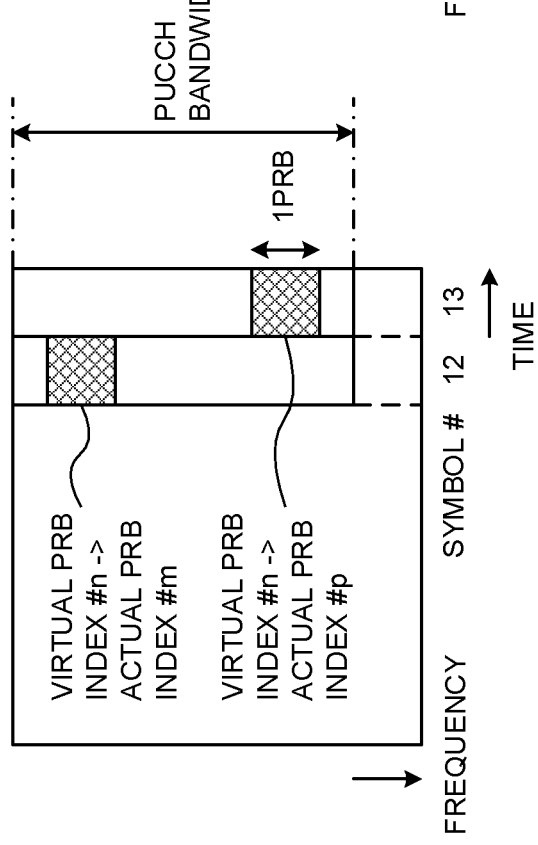

FIGS. 5A and 5B are diagrams illustrating one example of actual PRB indices that can be obtained from a calculation formula for improving a frequency diversity gain.

When the first calculation formula is used as illustrated in FIG. 5A, m can be obtained as the actual PRB index of the symbol #12, and p can be obtained as the actual PRB index of the symbol #13. m and p are symmetrical frequencies in the PUCCH bandwidth.

When, for example, the number of PRBs of the PUCCH bandwidth is 100, and the actual PRB index that can be obtained for a symbol whose symbol index is an odd number is 0, the actual PRB index that can be obtained for a symbol whose symbol index is an even number is 99. Thus, two neighboring symbols are arranged at symmetrical frequency positions in the PUCCH bandwidth, so that it is possible to increase a frequency diversity gain.

FIG. 5B illustrates a case where the second calculation formula similar to that in FIG. 4B is used, and the UE does not perform frequency hopping on a sequence-based PUCCH.

Second Embodiment

According to the second embodiment, a UE determines a code resource of a sequence-based PUCCH based on parameters notified from an NW. The code resource described herein is a reference sequence. For example, the reference sequence is indicated by a sequence index.

Hereinafter, the sequence index notified from the NW to the UE will be referred to as a virtual sequence index, and a sequence index indicating the reference sequence used to transmit an actual sequence-based PUCCH will be referred to as an actual sequence index.

The UE determines actual sequence indices from the virtual sequence index by using a given calculation formula. The calculation formula may use at least one of parameters such as a cell ID, a PRB index, a slot index, a symbol index, a sequence index, a CS index, a CS candidate set index, a CCE index of a PDCCH, an HARQ process ID, and a resource index of a PDSCH corresponding to A/N to be transmitted on a PUCCH.

Furthermore, the parameter may include or may not include a UE ID. When, for example, UE multiplexing is performed, the calculation formula may not use the UE ID. The UE multiplexing described herein refers to that sequence-based PUCCHs of different UEs in an identical cell are multiplexed in a CS domain of an identical time resource and an identical frequency resource. When UE multiplexing is performed, the NW notifies different UEs in the identical cell of different CS candidate sets. This is because using the UE ID makes actual sequence indices of a plurality of UEs in the identical cell identical in some cases. When, for example, UE multiplexing is not performed, the calculation formula may use the UE ID. By using the UE ID, it is possible to randomize the actual sequence indices, and reduce an inter-cell interference.

A virtual parameter that is notified from the NW to the UE, and an actual parameter that is actually used may be defined for each of these parameters. In this case, a sequence index calculation formula may use the virtual parameter or may use the actual parameter.

In, for example, the calculation formula, the actual sequence index is (virtual sequence index×cell ID×slot index×symbol index) mod (number of sequence candidates). The number of sequence candidates is the number of usable reference sequence candidates, and is, for example, 30.

The NW also determines the actual sequence indices by using the same calculation formula as that of the UE, so that the NW and the UE can determine the identical actual sequence indices.

The calculation formula uses the cell ID, so that, even when the virtual sequence index, the slot index and the symbol index are identical, it is possible to obtain different actual sequence indices from different cell IDs.

The UE uses this calculation formula, so that, even when sequence-based PUCCHs of a certain cell and surrounding cells use an identical reference sequence and an identical CS, it is possible to randomize reference sequences of the sequence-based PUCCHs, suppress a probability of occurrence of an inter-cell interference, and improve communication quality.

There is a case where an identical sequence index is allocated to sequence-based PUCCHs of different cells. The UE uses the calculation formula by using the allocated sequence index as a virtual sequence index, so that it is possible to reduce a probability that actual sequence indices of the sequence-based PUCCHs become identical between a certain cell and surrounding cells of the certain cell compared to a case where the NW allocates sequence indices.

Third Embodiment

According to the third embodiment, a UE determines a code resource of a sequence-based PUCCH based on a parameter notified from an NW. The code resource described herein is a CS candidate set. For example, the CS candidate set is indicated by a CS candidate set index.

Hereinafter, the CS candidate set index notified from the NW to the UE will be referred to as a virtual CS candidate set index, and the CS candidate set index indicating a CS candidate set that is used to transmit the actual sequence-based PUCCH will be referred to as a CS candidate set index.

The UE determines an actual CS candidate set index from the virtual CS candidate set index by using a given calculation formula. The calculation formula may use at least one of parameters such as a cell ID, a PRB index, a slot index, a symbol index, a sequence index, a CS index, a CS candidate set index, a CCE index of a PDCCH, an HARQ process ID, and a resource index of the PDSCH corresponding to A/N to be transmitted on a PUCCH.

A virtual parameter that is notified from the NW to the UE, and an actual parameter that is actually used may be defined for each of these parameters. In this case, a CS candidate set index calculation formula may use the virtual parameter or may use the actual parameter.

In, for example, the calculation formula, the actual CS candidate set index is (virtual CS candidate set index×cell ID×slot index×symbol index) mod (number of CS candidate sets).

Figure 6:
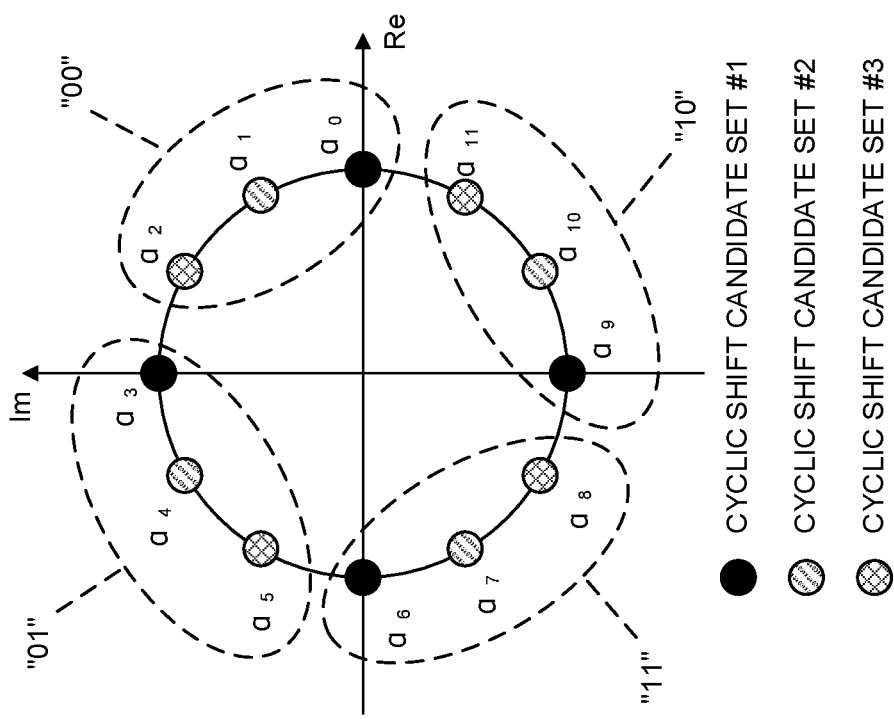
FIG. 6 is a diagram illustrating one example of a CS candidate set.

When, for example, a UCI length notified by the sequence-based PUCCH that uses 1 PRB is 2 bits as illustrated in FIG. 6, the number of CS candidate sets is 3. When the UCI length notified by the sequence-based PUCCH that uses 1 PRB is 1 bit, the number of CS candidate sets is 6. The number of CS candidate sets may be restricted by information notified from the NW to the UE by a higher layer signaling (e.g., an RRC signaling or broadcast information).

By restricting the number of CS candidate sets and increasing an interval between CS candidates (phase rotation amounts), it is possible to suppress an error rate of UCI in environment of significant frequency selectivity.

When UE multiplexing is not performed, the UE may determine an actual CS candidate set index as follows. The UE multiplexing described herein refers to that sequence-based PUCCHs of different UEs in an identical cell are multiplexed in a CS domain of an identical time resource and an identical frequency resource. When UE multiplexing is performed, the NW notifies the different UEs in the identical cell of different CS candidate sets.

The UE may assume that a virtual CS candidate set number is not notified from the NW, and determine an actual CS candidate set index. In a calculation formula in this case, the actual CS candidate set index is (cell ID×slot index× symbol index) mod (number of CS candidate sets).

The calculation formula may include a UE ID. In the calculation formula in this case, the actual CS candidate set index is (UE ID×cell ID×slot index×symbol index) mod (number of CS candidate sets).

Figures 7A, 7B:
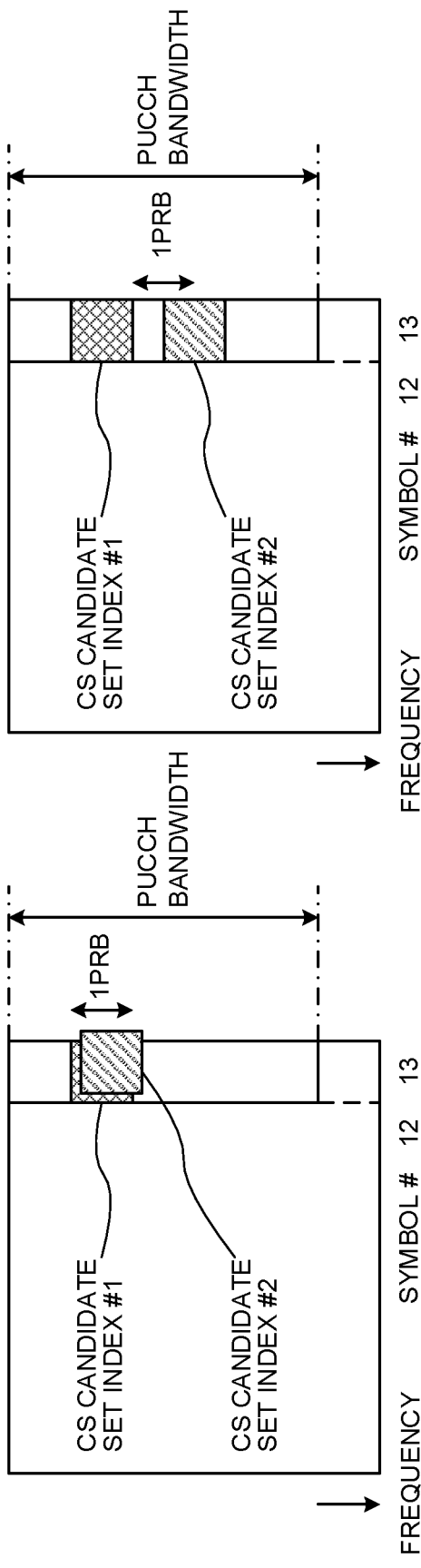
FIGS. 7A and 7B are diagrams illustrating one example of actual CS candidate set indices according to whether or not UE multiplexing is performed.

FIGS. 7A and 7B are diagrams illustrating one example of an actual CS candidate set index according to whether or not UE multiplexing is performed.

When UE multiplexing is performed as illustrated in FIG. 7A, the UE determines the actual CS candidate set index based on a virtual CS candidate set index notified from the NW. When the CS candidate set index is randomized by using a UE ID, a probability that a plurality of UEs use the identical CS candidate set in an identical PRB increases, and therefore the UE does not use the UE ID to randomize the CS candidate set index.

When UE multiplexing is not performed as illustrated in FIG. 7B, the UE determines the actual CS candidate set index by using a given calculation formula without using the virtual CS candidate set index. In this regard, the UE may or may not randomize the CS candidate set by using the UE ID.

The UE uses these calculation formulae, so that, even when an identical reference sequence and an identical CS are notified for sequence-based PUCCHs of a certain cell and surrounding cells from the NW, it is possible to randomize CS candidate sets that are actually used by the sequence-based PUCCHs, and reduce a probability that the sequence-based PUCCHs of the certain cell and the surrounding cells use the identical reference sequence and the identical CS. Consequently, it is possible to suppress a probability of occurrence of an inter-cell interference, and improve communication quality.

Furthermore, the UE determines the actual CS candidate set index by using the different calculation formulae in a case where UE multiplexing is performed and in a case where UE multiplexing is not performed, so that it is possible to prevent an inter-UE interference in the identical cell, and prevent the inter-cell interference.

Fourth Embodiment

According to the fourth embodiment, a UE determines a time resource of a sequence-based PUCCH based on a parameter notified from an NW. For example, the time resource is indicated by a symbol index.

Hereinafter, the symbol index notified from the NW to the UE will be referred to as a virtual symbol index, and the symbol index indicating a symbol used to transmit an actual sequence-based PUCCH will be referred to as an actual symbol index.

The UE determines the actual symbol index from the virtual symbol index by using a given calculation formula. The calculation formula may use at least one of parameters such as a cell ID, a PRB index, a slot index, a symbol index, a sequence index, a CS index, a CS candidate set index, a CCE index of a PDCCH, an HARQ process ID, and a resource index of the PDSCH corresponding to A/N to be transmitted on a PUCCH.

Furthermore, the parameter may include or may not include a UE ID. When, for example, UE multiplexing is performed, the calculation formula may not use a UE ID. The UE multiplexing described herein refers to that sequence-based PUCCHs of different UEs in an identical cell are multiplexed in a CS domain of an identical time resource and an identical frequency resource. When UE multiplexing is performed, the NW notifies the different UEs in the identical cell of different CS candidate sets. This is because using the UE ID makes actual symbol indices of a plurality of UEs in the identical cell identical in some cases. When, for example, UE multiplexing is not performed, the calculation formula may use the UE ID. By using the UE ID, it is possible to randomize the actual symbol indices, and reduce an inter-cell interference.

A virtual parameter that is notified from the NW to the UE, and an actual parameter that is actually used may be defined for each of these parameters. In this case, a symbol index calculation formula may use the virtual parameter or may use the actual parameter.

In, for example, the calculation formula, the actual symbol index is (virtual symbol index×cell ID×slot index) mod (number of PUCCH symbols). Each of the virtual symbol indices and the actual symbol indices is 0, 1, . . . and the number of PUCCH symbols−1.

The NW also determines the actual symbol indices by using the same calculation formula as that of the UE, so that the NW and the UE can determine the identical actual symbol indices.

Figure 8A:
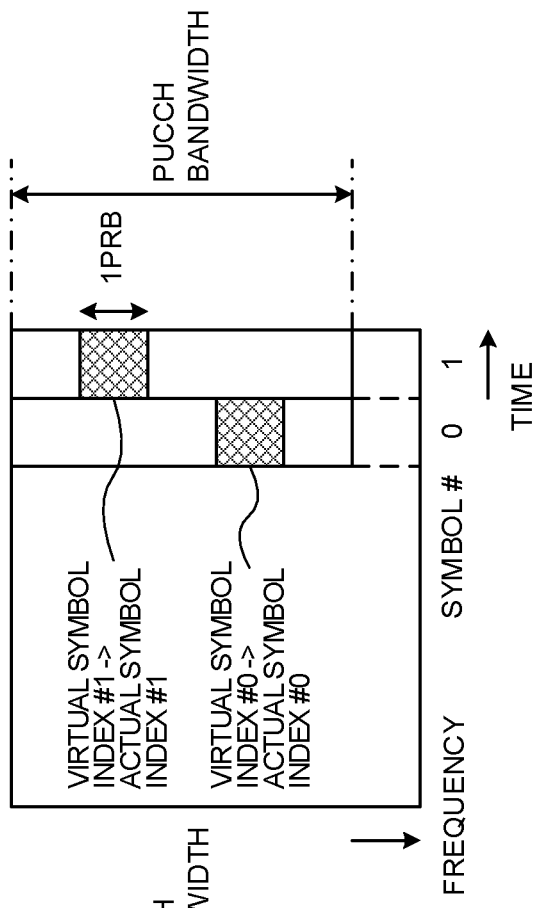
FIGS. 8A and 8B are diagrams illustrating one example of a combination of two actual symbol indices that can be obtained from an identical combination of virtual symbol indices.
Figure 8B:
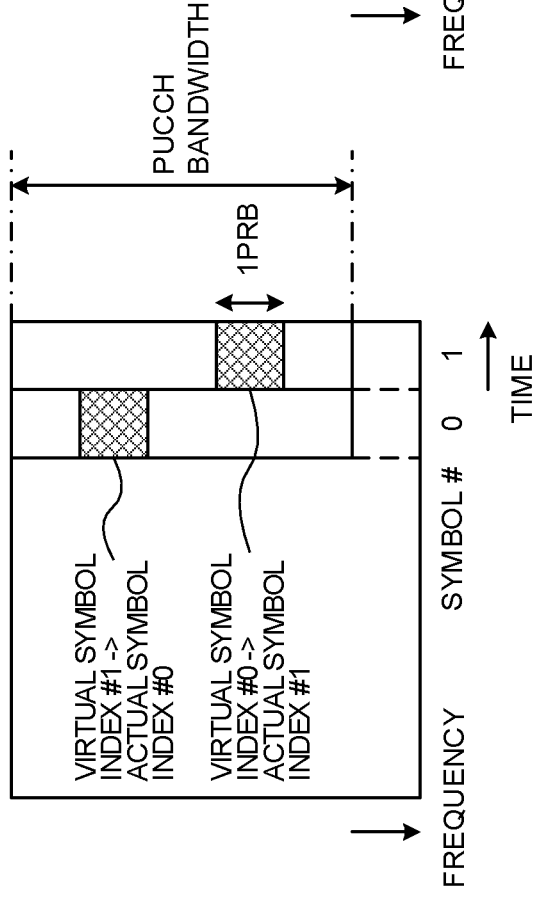

FIGS. 8A and 8B are diagrams illustrating one example of a combination of two actual symbol indices that can be obtained from an identical combination of virtual symbol indices. In this example, the virtual symbol indices are 0 and 1 and, a slot index is 1. In this example, although the sequence-based PUCCH is transmitted over 2 symbols, the UE can determine the actual symbol indices likewise even in a case of sequence-based PUCCHs having time durations equal to or more than 3 symbols.

When a cell ID is 3 as illustrated in FIG. 8A, an actual symbol index #1 can be obtained from a virtual symbol index #0, and an actual symbol index #0 can be obtained from a virtual symbol index #1 according to the calculation formula.

When a cell ID is 2 as illustrated in FIG. 8B, the actual symbol index #0 can be obtained from the virtual symbol index #0, and the actual symbol index #1 can be obtained from the virtual symbol index #1 according to the calculation formula.

The calculation formula uses a cell ID, so that, even when the virtual symbol indices and the slot indices are identical, it is possible to obtain different actual symbol indices from different cell IDs.

The UE uses this calculation formula, so that, even when sequence-based PUCCHs of a certain cell and surrounding cells use an identical reference sequence and an identical CS, it is possible to randomize symbols of a sequence-based PUCCH, suppress a probability of occurrence of an inter-cell interference, and improve communication quality.

There is a case where an identical symbol index is allocated to sequence-based PUCCHs of different cells. The UE uses the calculation formula by using the allocated symbol index as a virtual symbol index, so that it is possible to reduce a probability that actual symbol indices of the sequence-based PUCCHs become identical between a certain cell and surrounding cells of the certain cell compared to a case where the NW allocates symbol indices.

In addition, based on at least one of a plurality of virtual indices (e.g., virtual PRB indices, virtual sequence indices, virtual CS candidate set indices or virtual symbol indices) described in the first to fourth embodiments, the UE may calculate at least one of a plurality of actual indices (e.g., actual PRB indices, actual sequence indices, actual CS candidate set indices or actual symbol indices). The UE randomizes a plurality of resources, so that it is possible to reduce a probability that sequence-based PUCCHs of a certain cell and surrounding cells use an identical resource, and consequently suppress the probability of occurrence of the inter-cell interference.

(Radio Communication System)

The configuration of the radio communication system according to one embodiment of the present invention will be described below. This radio communication system uses one or a combination of the radio communication method according to each of the above embodiments of the present invention to perform communication.

Figure 9:
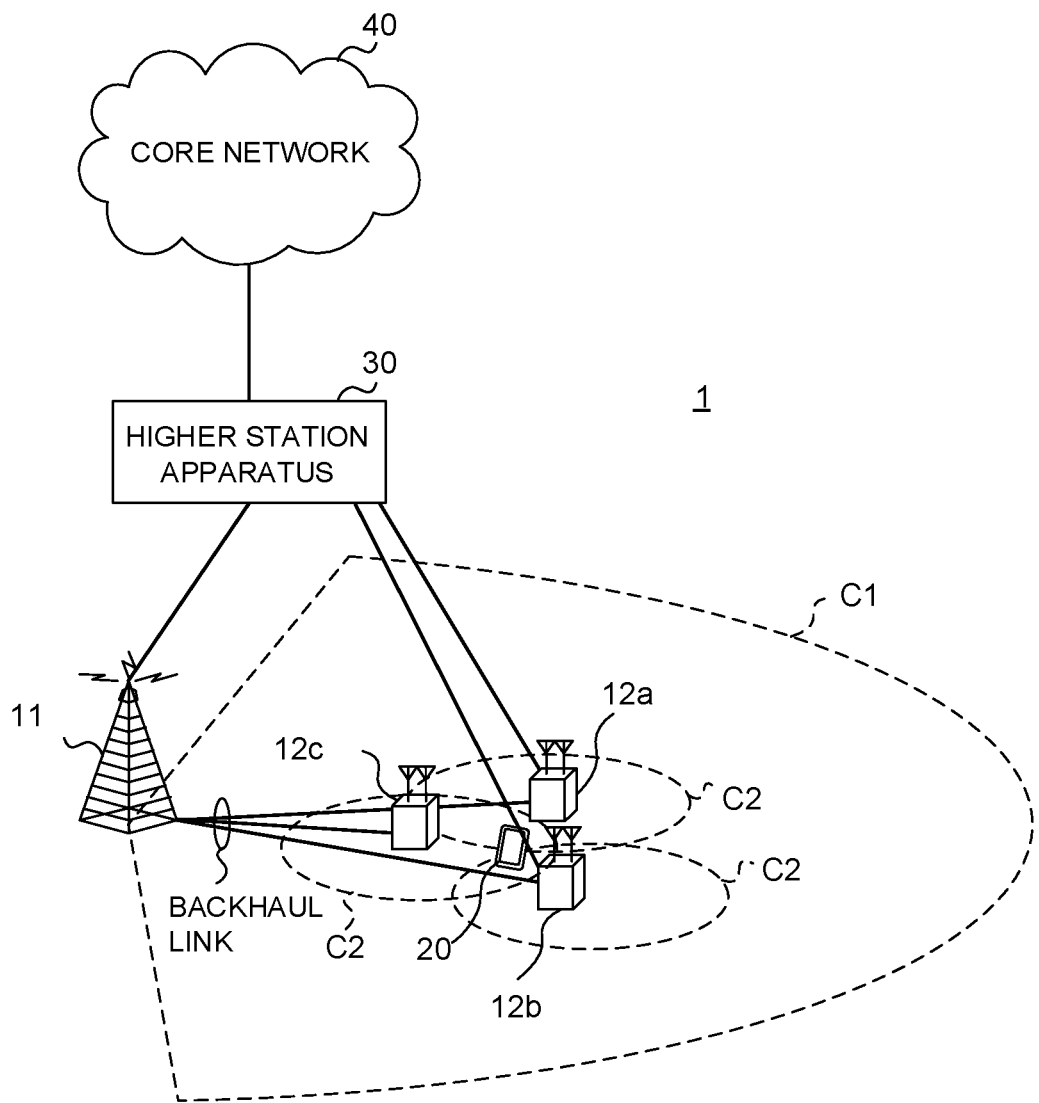
FIG. 9 is a diagram illustrating one example of a schematic configuration of a radio communication system according to one embodiment of the present invention.

FIG. 9 is a diagram illustrating one example of a schematic configuration of the radio communication system according to the one embodiment of the present invention. A radio communication system 1 can apply Carrier Aggregation (CA) and/or Dual Connectivity (DC) that aggregate a plurality of base frequency blocks (component carriers) whose 1 unit is a system bandwidth (e.g., 20 MHz) of the LTE system.

In this regard, the radio communication system 1 may be referred to as Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), New Radio (NR), Future Radio Access (FRA) and the New Radio Access Technology (New-RAT), or a system that realizes these techniques.

The radio communication system 1 includes a radio base station 11 that forms a macro cell C1 of a relatively wide coverage, and radio base stations 12 (12a to 12c) that are located in the macro cell C1 and form small cells C2 narrower than the macro cell C1. Furthermore, a user terminal 20 is located in the macro cell C1 and each small cell C2. An arrangement and the numbers of respective cells and the user terminals 20 are not limited to those illustrated in FIG. 9.

The user terminal 20 can connect with both of the radio base station 11 and the radio base stations 12. The user terminal 20 is assumed to concurrently use the macro cell C1 and the small cells C2 by CA or DC. Furthermore, the user terminal 20 can apply CA or DC by using a plurality of cells (CCs) (e.g., five CCs or less or six CCs or more).

The user terminal 20 and the radio base station 11 can communicate by using a carrier (also referred to as a legacy carrier) of a narrow bandwidth in a relatively low frequency band (e.g., 2 GHz). On the other hand, the user terminal 20 and each radio base station 12 may use a carrier of a wide bandwidth in a relatively high frequency band (e.g., 3.5 GHz or 5 GHz) or may use the same carrier as that used between the user terminal 20 and the radio base station 11. In this regard, a configuration of the frequency band used by each radio base station is not limited to this.

The radio base station 11 and each radio base station 12 (or the two radio base stations 12) may be configured to be connected by way of wired connection (e.g., optical fibers compliant with a Common Public Radio Interface (CPRI) or an X2 interface) or radio connection.

The radio base station 11 and each radio base station 12 are each connected with a higher station apparatus 30 and connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB) or a transmission/reception point. Furthermore, each radio base station 12 is a radio base station that has a local coverage, and may be referred to as a small base station, a micro base station, a pico base station, a femto base station, a Home eNodeB (HeNB), a Remote Radio Head (RRH) or a transmission/reception point. The radio base stations 11 and 12 will be collectively referred to as a radio base station 10 below when not distinguished.

Each user terminal 20 is a terminal that supports various communication schemes such as LTE and LTE-A, and may include not only a mobile communication terminal (mobile station) but also a fixed communication terminal (fixed station).

The radio communication system 1 applies Orthogonal Frequency-Division Multiple Access (OFDMA) to downlink and Single Carrier-Frequency Division Multiple Access (SC-FDMA) and/or OFDMA to uplink as radio access schemes.

OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into bands including one or contiguous resource blocks per terminal and causes a plurality of terminals to use respectively different bands to reduce an inter-terminal interference. In this regard, uplink and downlink radio access schemes are not limited to a combination of these, and other radio access schemes may be used.

The radio communication system 1 uses a downlink shared channel (PDSCH: Physical Downlink Shared Channel) shared by each user terminal 20, a broadcast channel (PBCH: Physical Broadcast Channel) and a downlink L1/L2 control channel as downlink channels. User data, higher layer control information and System Information Blocks (SIBs) are conveyed on the PDSCH. Furthermore, Master Information Blocks (MIBs) are conveyed on the PBCH.

The downlink L1/L2 control channel includes a Physical Downlink Control Channel (PDCCH), an Enhanced Physical Downlink Control Channel (EPDCCH), a Physical Control Format Indicator Channel (PCFICH), and a Physical Hybrid-ARQ Indicator Channel (PHICH). Downlink Control Information (DCI) including scheduling information of the PDSCH and/or the PUSCH is conveyed on the PDCCH.

In addition, the scheduling information may be notified by the DCI. For example, DCI for scheduling DL data reception may be referred to as a DL assignment, and DCI for scheduling UL data transmission may be referred to as a UL grant.

The number of OFDM symbols used for the PDCCH is conveyed on the PCFICH. Transmission acknowledgement information (also referred to as, for example, retransmission control information, HARQ-ACK or ACK/NACK) of a Hybrid Automatic Repeat reQuest (HARQ) for the PUSCH is conveyed on the PHICH. The EPDCCH is subjected to frequency division multiplexing with the PDSCH (downlink shared data channel) and is used to convey DCI similar to the PDCCH.

The radio communication system 1 uses an uplink shared channel (PUSCH: Physical Uplink Shared Channel) shared by each user terminal 20, an uplink control channel (PUCCH: Physical Uplink Control Channel), and a random access channel (PRACH: Physical Random Access Channel) as uplink channels. User data and higher layer control information are conveyed on the PUSCH. Furthermore, downlink radio quality information (CQI: Channel Quality Indicator), transmission acknowledgement information and a Scheduling Request (SR) are conveyed on the PUCCH. A random access preamble for establishing connection with a cell is conveyed on the PRACH.

The radio communication system 1 conveys a Cell-specific Reference Signal (CRS), a Channel State Information-Reference Signal (CSI-RS), a DeModulation Reference Signal (DMRS) and a Positioning Reference Signal (PRS) as downlink reference signals. Furthermore, the radio communication system 1 conveys a Sounding Reference Signal (SRS) and a DeModulation Reference Signal (DMRS) as uplink reference signals. In this regard, the DMRS may be referred to as a user terminal-specific reference signal (UE-specific Reference Signal). Furthermore, a reference signal to be conveyed is not limited to these.

<Radio Base Station>

Figure 10:
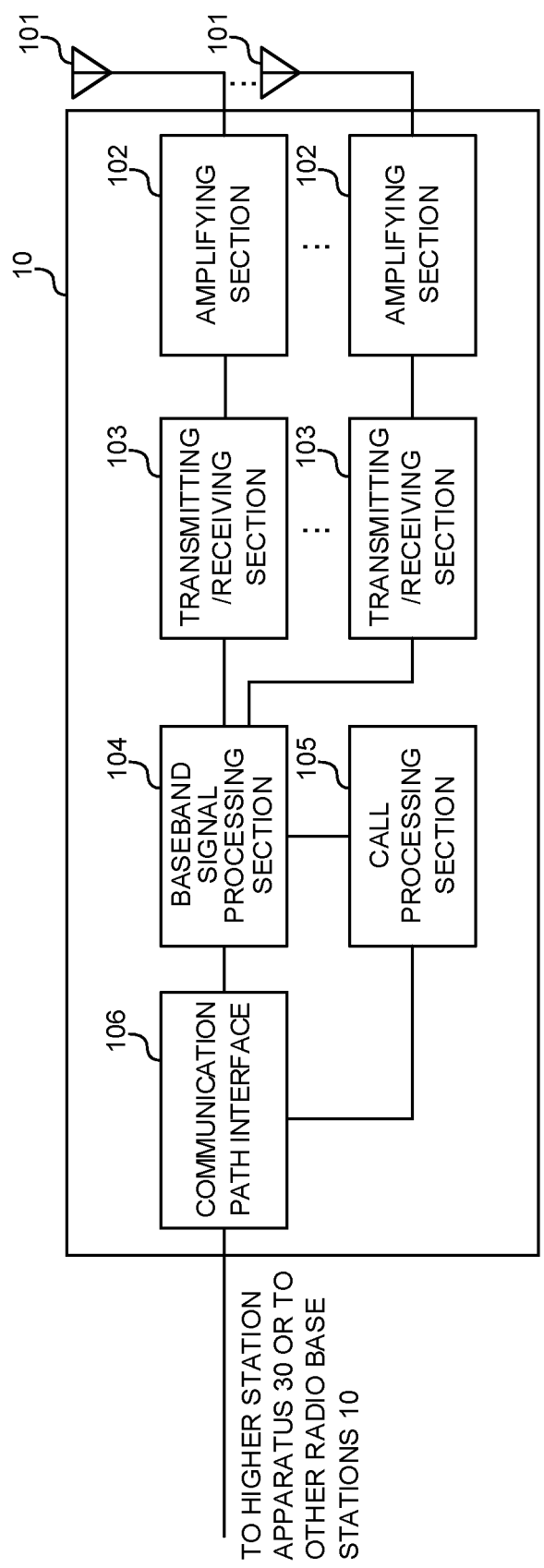
FIG. 10 is a diagram illustrating one example of an overall configuration of a radio base station according to the one embodiment of the present invention.

FIG. 10 is a diagram illustrating one example of an overall configuration of the radio base station according to the one embodiment of the present invention. The radio base station 10 includes pluralities of transmission/reception antennas 101, amplifying sections 102 and transmitting/receiving sections 103, a baseband signal processing section 104, a call processing section 105 and a channel interface 106. In this regard, the radio base station 10 only needs to be configured to include one or more of each of the transmission/reception antennas 101, the amplifying sections 102 and the transmitting/receiving sections 103.

User data transmitted from the radio base station 10 to the user terminal 20 on downlink is input from the higher station apparatus 30 to the baseband signal processing section 104 via the channel interface 106.

The baseband signal processing section 104 performs processing of a Packet Data Convergence Protocol (PDCP) layer, segmentation and concatenation of the user data, transmission processing of a Radio Link Control (RLC) layer such as RLC retransmission control, Medium Access Control (MAC) retransmission control (e.g., HARQ transmission processing), and transmission processing such as scheduling, transmission format selection, channel coding, Inverse Fast Fourier Transform (IFFT) processing, and precoding processing on the user data, and transfers the user data to each transmitting/receiving section 103. Furthermore, the baseband signal processing section 104 performs transmission processing such as channel coding and inverse fast Fourier transform on a downlink control signal, too, and transfers the downlink control signal to each transmitting/receiving section 103.

Each transmitting/receiving section 103 converts a baseband signal precoded and output per antenna from the baseband signal processing section 104 into a radio frequency range, and transmits a radio frequency signal. The radio frequency signal subjected to frequency conversion by each transmitting/receiving section 103 is amplified by each amplifying section 102, and is transmitted from each transmission/reception antenna 101. The transmitting/receiving sections 103 can be composed of transmitters/receivers, transmission/reception circuits or transmission/reception apparatuses described based on a common knowledge in a technical field according to the present invention. In this regard, the transmitting/receiving sections 103 may be composed as an integrated transmitting/receiving section or may be composed of transmitting sections and reception sections.

Meanwhile, each amplifying section 102 amplifies a radio frequency signal received by each transmission/reception antenna 101 as an uplink signal. Each transmitting/receiving section 103 receives the uplink signal amplified by each amplifying section 102. Each transmitting/receiving section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, MAC retransmission control reception processing, and reception processing of an RLC layer and a PDCP layer on user data included in the input uplink signal, and transfers the user data to the higher station apparatus 30 via the channel interface 106. The call processing section 105 performs call processing (configuration and release) of a communication channel, state management of the radio base station 10, and radio resource management.

The channel interface 106 transmits and receives signals to and from the higher station apparatus 30 via a given interface. Furthermore, the channel interface 106 may transmit and receive (backhaul signaling) signals to and from the another radio base station 10 via an inter-base station interface (e.g., optical fibers compliant with the Common Public Radio Interface (CPRI) or the X2 interface).

Furthermore, each transmitting/receiving section 103 may receive an uplink signal (e.g., sequence-based PUCCH) by using a code resource (e.g., cyclic shift) associated with a value of Uplink Control Information (UCI).

Furthermore, each transmitting/receiving section 103 may transmit a parameter for the sequence-based PUCCH to the user terminal 20.

Figure 11:
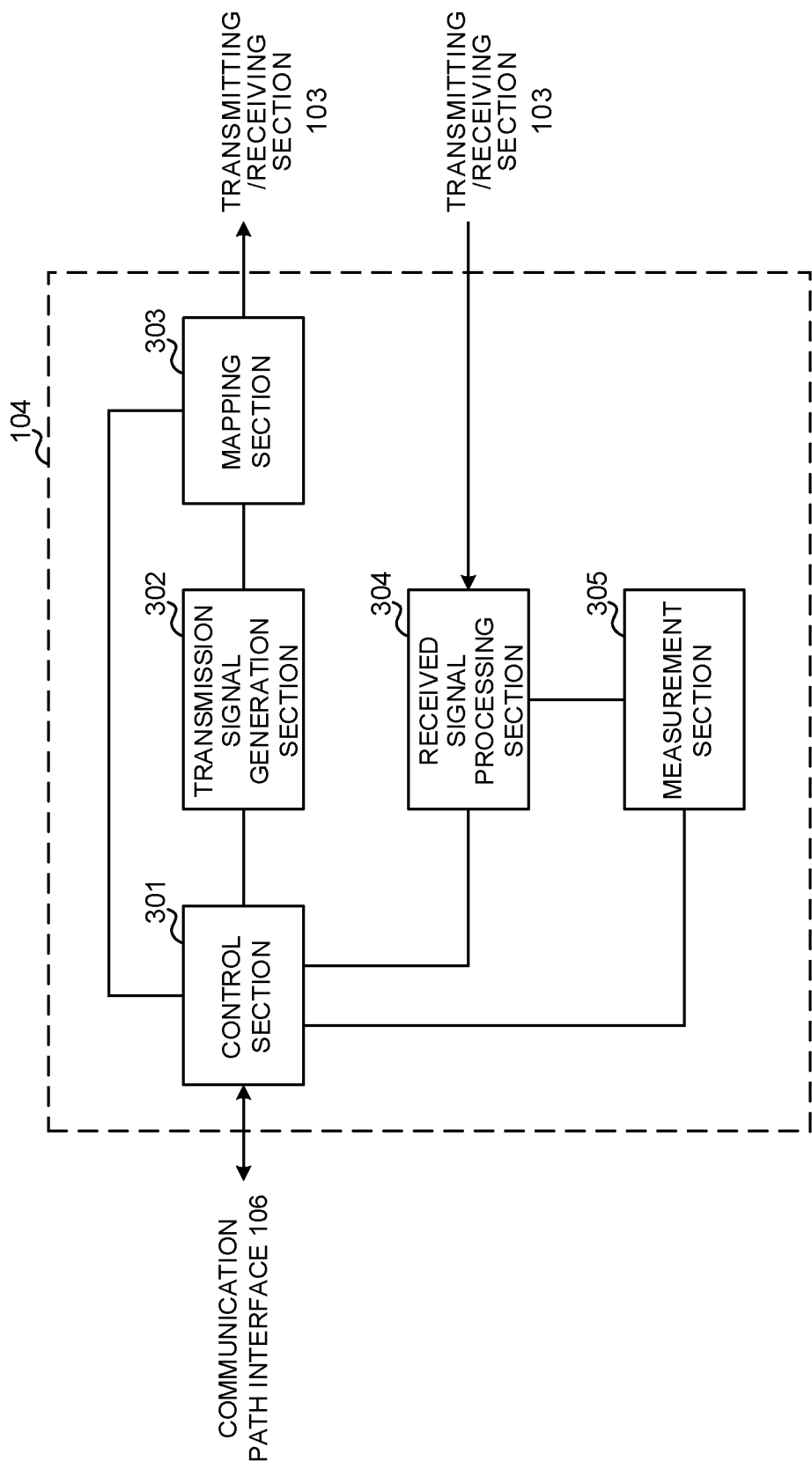
FIG. 11 is a diagram illustrating one example of a function configuration of the radio base station according to the one embodiment of the present invention.

FIG. 11 is a diagram illustrating one example of a function configuration of the radio base station according to the one embodiment of the present invention. In addition, this example mainly illustrates function blocks of characteristic portions according to the present embodiment, and assumes that the radio base station 10 includes other function blocks, too, that are necessary for radio communication.

The baseband signal processing section 104 includes at least a control section (scheduler) 301, a transmission signal generating section 302, a mapping section 303, a received signal processing section 304 and a measurement section 305. In addition, these components only need to be included in the radio base station 10, and part or all of the components may not be included in the baseband signal processing section 104.

The control section (scheduler) 301 controls the entire radio base station 10. The control section 301 can be composed of a controller, a control circuit or a control apparatus described based on the common knowledge in the technical field according to the present invention.

The control section 301 controls, for example, signal generation of the transmission signal generating section 302 and signal allocation of the mapping section 303. Furthermore, the control section 301 controls signal reception processing of the received signal processing section 304 and signal measurement of the measurement section 305.

The control section 301 controls scheduling (e.g., resource allocation) of system information, a downlink data signal (e.g., a signal that is transmitted on the PDSCH), and a downlink control signal (e.g., a signal that is transmitted on the PDCCH and/or the EPDCCH and is, for example, transmission acknowledgement information). Furthermore, the control section 301 controls generation of a downlink control signal and a downlink data signal based on a result obtained by deciding whether or not it is necessary to perform retransmission control on an uplink data signal. Furthermore, the control section 301 controls scheduling of synchronization signals (e.g., a Primary Synchronization Signal (PSS)/a Secondary Synchronization Signal (SSS)) and downlink reference signals (e.g., a CRS, a CSI-RS and a DMRS).

The control section 301 controls scheduling of an uplink data signal (e.g., a signal that is transmitted on the PUSCH), an uplink control signal (e.g., a signal that is transmitted on the PUCCH and/or the PUSCH and is, for example, transmission acknowledgement information), a random access preamble (e.g., a signal that is transmitted on the PRACH) and an uplink reference signal.

The transmission signal generating section 302 generates a downlink signal (such as a downlink control signal, a downlink data signal or a downlink reference signal) based on an instruction from the control section 301, and outputs the downlink signal to the mapping section 303. The transmission signal generating section 302 can be composed of a signal generator, a signal generating circuit or a signal generating apparatus described based on the common knowledge in the technical field according to the present invention.

The transmission signal generating section 302 generates, for example, a DL assignment for notifying downlink data allocation information, and/or a UL grant for notifying uplink data allocation information based on the instruction from the control section 301. The DL assignment and the UL grant are both DCI, and conform to a DCI format. Furthermore, the transmission signal generating section 302 performs encoding processing and modulation processing on a downlink data signal according to a code rate and a modulation scheme determined based on Channel State Information (CSI) from each user terminal 20.

The mapping section 303 maps the downlink signal generated by the transmission signal generating section 302, on given radio resources based on the instruction from the control section 301, and outputs the downlink signal to each transmitting/receiving section 103. The mapping section 303 can be composed of a mapper, a mapping circuit or a mapping apparatus described based on the common knowledge in the technical field according to the present invention.

The received signal processing section 304 performs reception processing (e.g., demapping, demodulation and decoding) on a received signal input from each transmitting/receiving section 103. In this regard, the received signal is, for example, an uplink signal (such as an uplink control signal, an uplink data signal or an uplink reference signal) transmitted from the user terminal 20. The received signal processing section 304 can be composed of a signal processor, a signal processing circuit or a signal processing apparatus described based on the common knowledge in the technical field according to the present invention.

The received signal processing section 304 outputs information decoded by the reception processing to the control section 301. When, for example, receiving the PUCCH including HARQ-ACK, the received signal processing section 304 outputs the HARQ-ACK to the control section 301. Furthermore, the received signal processing section 304 outputs the received signal and/or the signal after the reception processing to the measurement section 305.

The measurement section 305 performs measurement related to the received signal. The measurement section 305 can be composed of a measurement instrument, a measurement circuit or a measurement apparatus described based on the common knowledge in the technical field according to the present invention.

For example, the measurement section 305 may perform Radio Resource Management (RRM) measurement or Channel State Information (CSI) measurement based on the received signal. The measurement section 305 may measure received power (e.g., Reference Signal Received Power (RSRP)), received quality (e.g., Reference Signal Received Quality (RSRQ) or a Signal to Interference plus Noise Ratio (SINR)), a signal strength (e.g., Received Signal Strength Indicator (RSSI)) or channel information (e.g., CSI). The measurement section 305 may output a measurement result to the control section 301.

Furthermore, the control section 301 may allocate the resources for the sequence-based PUCCH to the user terminal 20.

<User Terminal>

FIG. 12 is a diagram illustrating one example of an overall configuration of the user terminal according to the one embodiment of the present invention. The user terminal 20 includes pluralities of transmission/reception antennas 201, amplifying sections 202 and transmitting/receiving sections 203, a baseband signal processing section 204 and an application section 205. In this regard, the user terminal 20 only needs to be configured to include one or more of each of the transmission/reception antennas 201, the amplifying sections 202 and the transmitting/receiving sections 203.

Each amplifying section 202 amplifies a radio frequency signal received at each transmission/reception antenna 201. Each transmitting/receiving section 203 receives a downlink signal amplified by each amplifying section 202. Each transmitting/receiving section 203 performs frequency conversion on the received signal into a baseband signal, and outputs the baseband signal to the baseb and signal processing section 204. The transmitting/receiving sections 203 can be composed of transmitters/receivers, transmission/reception circuits or transmission/reception apparatuses described based on the common knowledge in the technical field according to the present invention. In this regard, the transmitting/receiving sections 203 may be composed as an integrated transmitting/receiving section or may be composed of transmitting sections and reception sections.

The baseband signal processing section 204 performs FFT processing, error correcting decoding, and retransmission control reception processing on the input baseband signal. The baseband signal processing section 204 transfers downlink user data to the application section 205. The application section 205 performs processing related to layers higher than a physical layer and an MAC layer. Furthermore, the baseband signal processing section 204 may transfer broadcast information of the downlink data, too, to the application section 205.

On the other hand, the application section 205 inputs uplink user data to the baseband signal processing section 204. The baseband signal processing section 204 performs retransmission control transmission processing (e.g., HARQ transmission processing), channel coding, precoding, Discrete Fourier Transform (DFT) processing and IFFT processing on the uplink user data, and transfers the uplink user data to each transmitting/receiving section 203. Each transmitting/receiving section 203 converts the baseband signal output from the baseband signal processing section 204 into a radio frequency range, and transmits a radio frequency signal. The radio frequency signal subjected to the frequency conversion by each transmitting/receiving section 203 is amplified by each amplifying section 202, and is transmitted from each transmission/reception antenna 201.

Furthermore, each transmitting/receiving section 203 may transmit the uplink signal (e.g., sequence-based PUCCH) by using the code resource (e.g., cyclic shift) associated with the value of the Uplink Control Information (UCI).

Furthermore, each transmitting/receiving section 203 may receive the parameter for the sequence-based PUCCH from the radio base station 10.

Figure 13:
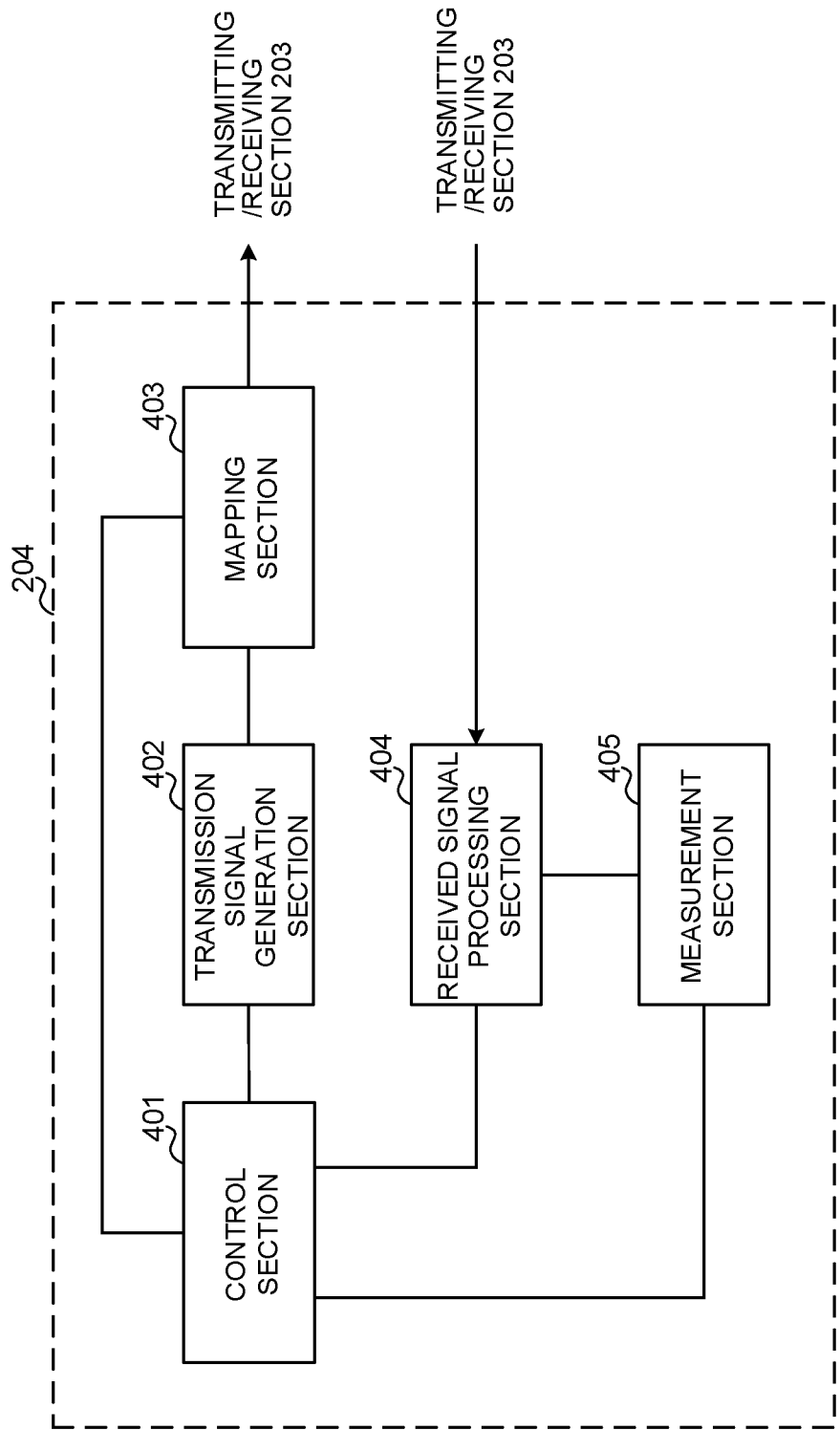
FIG. 13 is a diagram illustrating one example of a function configuration of the user terminal according to the one embodiment of the present invention.

FIG. 13 is a diagram illustrating one example of a function configuration of the user terminal according to the one embodiment of the present invention. In addition, this example mainly illustrates function blocks of characteristic portions according to the present embodiment, and assumes that the user terminal 20 includes other function blocks, too, that are necessary for radio communication.

The baseband signal processing section 204 of the user terminal 20 includes at least a control section 401, a transmission signal generating section 402, a mapping section 403, a received signal processing section 404 and a measurement section 405. In addition, these components only need to be included in the user terminal 20, and part or all of the components may not be included in the baseband signal processing section 204.

The control section 401 controls the entire user terminal 20. The control section 401 can be composed of a controller, a control circuit or a control apparatus described based on the common knowledge in the technical field according to the present invention.

The control section 401 controls, for example, signal generation of the transmission signal generating section 402 and signal allocation of the mapping section 403. Furthermore, the control section 401 controls signal reception processing of the received signal processing section 404 and signal measurement of the measurement section 405.

The control section 401 obtains from the received signal processing section 404 a downlink control signal and a downlink data signal transmitted from the radio base station 10. The control section 401 controls generation of an uplink control signal and/or an uplink data signal based on a result obtained by deciding whether or not it is necessary to perform retransmission control on the downlink control signal and/or the downlink data signal.

When obtaining from the received signal processing section 404 various pieces of information notified from the radio base station 10, the control section 401 may update the parameter used for control based on the various pieces of information.

The transmission signal generating section 402 generates an uplink signal (such as an uplink control signal, an uplink data signal or an uplink reference signal) based on an instruction from the control section 401, and outputs the uplink signal to the mapping section 403. The transmission signal generating section 402 can be composed of a signal generator, a signal generating circuit or a signal generating apparatus described based on the common knowledge in the technical field according to the present invention.

The transmission signal generating section 402 generates an uplink control signal related to transmission acknowledgement information and Channel State Information (CSI) based on, for example, the instruction from the control section 401. Furthermore, the transmission signal generating section 402 generates an uplink data signal based on the instruction from the control section 401. When, for example, the downlink control signal notified from the radio base station 10 includes a UL grant, the transmission signal generating section 402 is instructed by the control section 401 to generate an uplink data signal.

The mapping section 403 maps the uplink signal generated by the transmission signal generating section 402, on radio resources based on the instruction from the control section 401, and outputs the uplink signal to each transmitting/receiving section 203. The mapping section 403 can be composed of a mapper, a mapping circuit or a mapping apparatus described based on the common knowledge in the technical field according to the present invention.

The received signal processing section 404 performs reception processing (e.g., demapping, demodulation and decoding) on the received signal input from each transmitting/receiving section 203. In this regard, the received signal is, for example, a downlink signal (such as a downlink control signal, a downlink data signal or a downlink reference signal) transmitted from the radio base station 10. The received signal processing section 404 can be composed of a signal processor, a signal processing circuit or a signal processing apparatus described based on the common knowledge in the technical field according to the present invention. Furthermore, the received signal processing section 404 can compose the reception section according to the present invention.

The received signal processing section 404 outputs information decoded by the reception processing to the control section 401. The received signal processing section 404 outputs, for example, broadcast information, system information, an RRC signaling and DCI to the control section 401. Furthermore, the received signal processing section 404 outputs the received signal and/or the signal after the reception processing to the measurement section 405.

The measurement section 405 performs measurement related to the received signal. The measurement section 405 can be composed of a measurement instrument, a measurement circuit or a measurement apparatus described based on the common knowledge in the technical field according to the present invention.

For example, the measurement section 405 may perform RRM measurement or CSI measurement based on the received signal. The measurement section 405 may measure received power (e.g., RSRP), received quality (e.g., RSRQ or an SINR), a signal strength (e.g., RSSI) or channel information (e.g., CSI). The measurement section 405 may output a measurement result to the control section 401.

Furthermore, based on indication information (e.g., at least one of a virtual PRB index, a virtual sequence index, a virtual CS candidate set index and a virtual symbol index) that is notified from the radio base station 10 and indicates at least one resource of a time resource (e.g., symbol), a frequency resource (e.g., PRB), and a code resource (e.g., a reference sequence or a CS candidate set), the control section 401 may control determination of one transmission resource (indicated by at least one of, for example, an actual PRB index, an actual sequence index, an actual CS candidate set index and an actual symbol index) of the time resource, the frequency resource and the code resource used for the uplink signal (e.g., sequence-based PUCCH).

Furthermore, by using a given calculation formula that uses a parameter (e.g., at least one of, for example, a cell ID, a PRB index, a slot index, a symbol index, a sequence index, a CS index, a CS candidate set index, a CCE index of a PDCCH, an HARQ process ID, a resource index of the PDSCH corresponding to A/N to be transmitted on a PUCCH and a UE ID) notified from the radio base station 10, the control section 401 may convert an identifier of the resource indicated by the indication information into an identifier of the transmission resource.

Furthermore, the parameter may include a cell identifier (e.g., cell ID).

Furthermore, the control section 401 may determine one of a plurality of calculation formulae based on information from the radio base station 10, and may determine the transmission resources by using the determined calculation formula.

Furthermore, a plurality of calculation formulae may include a calculation formula that uses indices of symbols used for the uplink signal, and a calculation formula that does not use the indices of the symbols used for the uplink signal.

<Hardware Configuration>

In addition, the block diagrams used to describe the above embodiments illustrate blocks in function units. These function blocks (components) are realized by an optional combination of hardware and/or software. Furthermore, a method for realizing each function block is not limited in particular. That is, each function block may be realized by using one physically and/or logically coupled apparatus or may be realized by using a plurality of these apparatuses formed by connecting two or more physically and/or logically separate apparatuses directly and/or indirectly (by using, for example, wired connection and/or radio connection).

Figure 14:
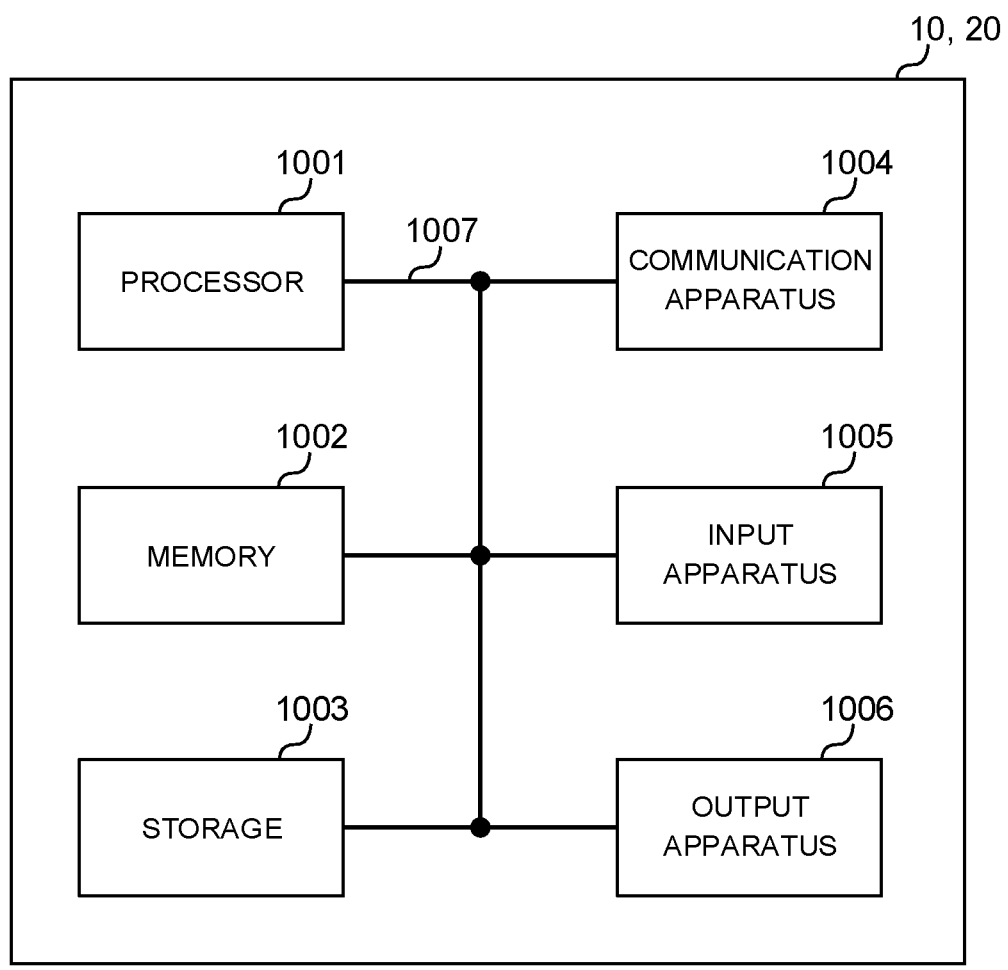
FIG. 14 is a diagram illustrating one example of hardware configurations of the radio base station and the user terminal according to the one embodiment of the present invention.

For example, the radio base station and the user terminal according to the one embodiment of the present invention may function as computers that perform processing of the radio communication method according to the present invention. FIG. 14 is a diagram illustrating one example of the hardware configurations of the radio base station and the user terminal according to the one embodiment of the present invention. The above-described radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 14 or may be configured without including part of the apparatuses.

For example, FIG. 14 illustrates the only one processor 1001. However, there may be a plurality of processors. Furthermore, processing may be executed by 1 processor or processing may be executed by 1 or more processors concurrently, successively or by using another method. In addition, the processor 1001 may be implemented by 1 or more chips.

Each function of the radio base station 10 and the user terminal 20 is realized by, for example, causing hardware such as the processor 1001 and the memory 1002 to read given software (program), and thereby causing the processor 1001 to perform an operation, and control communication via the communication apparatus 1004 and reading and/or writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, the above-described baseband signal processing section 104 (204) and call processing section 105 may be realized by the processor 1001.

Furthermore, the processor 1001 reads programs (program codes), a software module or data from the storage 1003 and/or the communication apparatus 1004 out to the memory 1002, and executes various types of processing according to these programs, software module or data. As the programs, programs that cause the computer to execute at least part of the operations described in the above embodiments are used. For example, the control section 401 of the user terminal 20 may be realized by a control program that is stored in the memory 1002 and operates on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to perform the radio communication method according to the one embodiment of the present invention.

The storage 1003 is a computer-readable recording medium, and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via wired and/or radio networks, and will be also referred to as, for example, a network device, a network controller, a network card and a communication module. The communication apparatus 1004 may be configured to include a high frequency switch, a duplexer, a filter and a frequency synthesizer to realize, for example, Frequency Division Duplex (FDD) and/or Time Division Duplex (TDD). For example, the above-described transmission/reception antennas 101 (201), amplifying sections 102 (202), transmitting/receiving sections 103 (203) and channel interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed by using a single bus or may be composed by using a bus that differs per apparatus.

Furthermore, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or all of each function block. For example, the processor 1001 may be implemented by using at least one of these types of hardware.

Modified Example

In addition, each term that has been described in this description and/or each term that is necessary to understand this description may be replaced with terms having identical or similar meanings. For example, a channel and/or a symbol may be signals (signalings). Furthermore, a signal may be a message. A reference signal can be also abbreviated as an RS (Reference Signal), or may be also referred to as a pilot or a pilot signal depending on standards to be applied. Furthermore, a Component Carrier (CC) may be referred to as a cell, a frequency carrier and a carrier frequency.

Furthermore, a radio frame may include one or a plurality of durations (frames) in a time-domain. Each of one or a plurality of durations (frames) that composes a radio frame may be referred to as a subframe. Furthermore, the subframe may include one or a plurality of slots in the time-domain. The subframe may be a fixed time duration (e.g., 1 ms) that does not depend on the numerologies.

Furthermore, the slot may include one or a plurality of symbols (Orthogonal Frequency Division Multiplexing (OFDM) symbols or Single Carrier-Frequency Division Multiple Access (SC-FDMA) symbols) in the time-domain. Furthermore, the slot may be a time unit based on the numerologies. Furthermore, the slot may include a plurality of mini slots. Each mini slot may include one or a plurality of symbols in the time-domain. Furthermore, the mini slot may be referred to as a sub slot.

The radio frame, the subframe, the slot, the mini slot and the symbol each indicate a time unit for conveying signals. The other corresponding names may be used for the radio frame, the subframe, the slot, the mini slot and the symbol. For example, 1 subframe may be referred to as a Transmission Time Interval (TTI), a plurality of contiguous subframes may be referred to as TTIs, or 1 slot or 1 mini slot may be referred to as a TTI. That is, the subframe and/or the TTI may be a subframe (1 ms) according to legacy LTE, may be a duration (e.g., 1 to 13 symbols) shorter than 1 ms or may be a duration longer than 1 ms. In addition, a unit that indicates the TTI may be referred to as a slot or a mini slot instead of a subframe.

In this regard, the TTI refers to, for example, a minimum time unit of scheduling for radio communication. For example, in the LTE system, the radio base station performs scheduling for allocating radio resources (a frequency bandwidth or transmission power that can be used in each user terminal) in TTI units to each user terminal. In this regard, a definition of the TTI is not limited to this.

The TTI may be a transmission time unit of a channel-coded data packet (transport block), code block and/or codeword, or may be a processing unit of scheduling or link adaptation. In addition, when the TTI is given, a time period (e.g., the number of symbols) in which a transport block, a code block and/or a codeword are actually mapped may be shorter than the TTI.

In addition, when 1 slot or 1 mini slot is referred to as a TTI, 1 or more TTIs (i.e., 1 or more slots or 1 or more mini slots) may be a minimum time unit of scheduling. Furthermore, the number of slots (the number of mini slots) that compose a minimum time unit of the scheduling may be controlled.

The TTI having the time duration of 1 ms may be referred to as a general TTI (TTIs according to LTE Rel. 8 to 12), a normal TTI, a long TTI, a general subframe, a normal subframe or a long subframe. A TTI shorter than the general TTI may be referred to as a reduced TTI, a short TTI, a partial or fractional TTI, a reduced subframe, a short subframe, a mini slot or a sub slot.

In addition, the long TTI (e.g., the general TTI or the subframe) may be read as a TTI having a time duration exceeding 1 ms, and the short TTI (e.g., the reduced TTI) may be read as a TTI having a TTI length less than the TTI length of the long TTI and equal to or more than 1 ms.

Resource Blocks (RBs) are resource allocation units of the time-domain and the frequency-domain, and may include one or a plurality of contiguous subcarriers in the frequency-domain. Furthermore, the RB may include one or a plurality of symbols in the time-domain or may have the length of 1 slot, 1 mini slot, 1 subframe or 1 TTI. 1 TTI or 1 subframe may each include one or a plurality of resource blocks. In this regard, one or a plurality of RBs may be referred to as a Physical Resource Block (PRB: Physical RB), a Sub-Carrier Group (SCG), a Resource Element Group (REG), a PRB pair or an RB pair.

Furthermore, the resource block may include one or a plurality of Resource Elements (REs). For example, 1 RE may be a radio resource domain of 1 subcarrier and 1 symbol.

In this regard, structures of the above-described radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and parameters described in this description may be expressed by using absolute values, may be expressed by using relative values with respect to given values or may be expressed by using other corresponding information. For example, a radio resource may be instructed by a given index.

Names used for parameters in this description are in no respect restrictive names. For example, various channels (the Physical Uplink Control Channel (PUCCH) and the Physical Downlink Control Channel (PDCCH)) and information elements can be identified based on various suitable names. Therefore, various names assigned to these various channels and information elements are in no respect restrictive names.

The information and the signals described in this description may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or optional combinations of these.

Furthermore, the information and the signals can be output from a higher layer to a lower layer and/or from the lower layer to the higher layer. The information and the signals may be input and output via a plurality of network nodes.

The input and output information and signals may be stored in a specific location (e.g., memory) or may be managed by using a management table. The information and signals to be input and output can be overwritten, updated or additionally written. The output information and signals may be deleted. The input information and signals may be transmitted to other apparatuses.

Notification of information is not limited to the aspect/embodiments described in this description and may be performed by using other methods. For example, the information may be notified by a physical layer signaling (e.g., Downlink Control Information (DCI) and Uplink Control Information (UCI)), a higher layer signaling (e.g., a Radio Resource Control (RRC) signaling, broadcast information (Master Information Blocks (MIBs) and System Information Blocks (SIBs)), and a Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by using, for example, an MAC Control Element (MAC CE).

Furthermore, notification of given information (e.g., notification of "being X") is not limited to explicit notification, and may be performed implicitly (by, for example, not notifying this given information or by notifying another information).

Decision may be made based on a value (0 or 1) expressed as 1 bit, may be made based on a boolean expressed as true or false or may be made by comparing numerical values (by, for example, making comparison with a given value).

Irrespectively of whether software is referred to as software, firmware, middleware, a microcode or a hardware description language or as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using wired techniques (e.g., coaxial cables, optical fiber cables, twisted pairs and Digital Subscriber Lines (DSLs)) and/or radio techniques (e.g., infrared rays and microwaves), these wired techniques and/or radio techniques are included in a definition of the transmission media.

The terms "system" and "network" used in this description are compatibly used.

In this description, the terms "Base Station (BS)", "radio base station", "eNB", "gNB", "cell", "sector", "cell group", "carrier" and "component carrier" can be compatibly used. The base station will be also referred to as a term such as a fixed station, a NodeB, an eNodeB (eNB), an access point, a transmission point, a reception point, a femtocell or a small cell in some cases.

The base station can accommodate one or a plurality of (e.g., three) cells (also referred to as sectors). When the base station accommodates a plurality of cells, an entire coverage area of the base station can be partitioned into a plurality of smaller areas. Each smaller area can provide communication service via a base station subsystem (e.g., indoor small base station (RRH: Remote Radio Head)). The term "cell" or "sector" indicates part or the entirety of the coverage area of the base station and/or the base station subsystem that provide communication service in this coverage.

In this description, the terms "Mobile Station (MS)", "user terminal", "User Equipment (UE)" and "terminal" can be compatibly used. The base station will be also referred to as a term such as a fixed station, a NodeB, an eNodeB (eNB), an access point, a transmission point, a reception point, a femtocell or a small cell in some cases.

The mobile station will be also referred to by a person skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

Furthermore, the radio base station in this description may be read as the user terminal. For example, each aspect/embodiment of the present invention may be applied to a configuration where communication between the radio base station and the user terminal is replaced with communication between a plurality of user terminals (D2D: Device-to-Device). In this case, the user terminal 20 may be configured to include the functions of the above-described radio base station 10. Furthermore, words such as "uplink" and "downlink" may be read as a "side". For example, the uplink channel may be read as a side channel.

Similarly, the user terminal in this description may be read as the radio base station. In this case, the radio base station 10 may be configured to include the functions of the above-described user terminal 20.

In this description, operations performed by the base station are performed by an upper node of this base station depending on cases. Obviously, in a network including one or a plurality of network nodes including the base stations, various operations performed to communicate with a terminal can be performed by base stations, one or more network nodes (that are supposed to be, for example, Mobility Management Entities (MMEs) or Serving-Gateways (S-GWs) yet are not limited to these) other than the base stations or a combination of these.

Each aspect/embodiment described in this description may be used alone, may be used in combination or may be switched and used when carried out. Furthermore, orders of the processing procedures, the sequences and the flowchart according to each aspect/embodiment described in this description may be rearranged unless contradictions arise. For example, the method described in this description presents various step elements in an exemplary order and is not limited to the presented specific order.

Each aspect/embodiment described in this description may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods and/or next-generation systems that are expanded based on these systems.

The phrase "based on" used in this description does not mean "based only on" unless specified otherwise. In other words, the phrase "based on" means both of "based only on" and "based at least on".

Every reference to elements that use names such as "first" and "second" used in this description does not generally limit the quantity or the order of these elements. These names can be used in this description as a convenient method for distinguishing between two or more elements. Hence, the reference to the first and second elements does not mean that only two elements can be employed or the first element should precede the second element in some way.

The term "deciding (determining)" used in this description includes diverse operations in some cases. For example, "deciding (determining)" may be regarded to "decide (determine)" calculating, computing, processing, deriving, investigating, looking up (e.g., looking up in a table, a database or another data structure) and ascertaining. Furthermore, "deciding (determining)" may be regarded to "decide (determine)" receiving (e.g., receiving information), transmitting (e.g., transmitting information), input, output and accessing (e.g., accessing data in a memory). Furthermore, "deciding (determining)" may be regarded to "decide (determine)" resolving, selecting, choosing, establishing and comparing. That is, "deciding (determining)" may be regarded to "decide (determine)" some operation.

The words "connected" and "coupled" used in this description or every modification of these words can mean every direct or indirect connection or coupling between 2 or more elements, and can include that 1 or more intermediate elements exist between the two elements "connected" or "coupled" with each other. The elements may be coupled or connected physically, logically or by a combination of the physical and logical connections. For example, "connection" may be read as "access".

It can be understood that, when connected in this description, the two elements are "connected" or "coupled" with each other by using 1 or more electric wires, cables and/or printed electrical connection, and by using electromagnetic energy having wavelengths in radio frequency-domains, microwave domains and/or (both of visible and invisible) light domains in some non-restrictive and non-comprehensive examples.

A sentence that "A and B are different" in this description may mean that "A and B are different from each other". Words such as "separate" and "coupled" may be also interpreted in a similar manner.

When the words "including" and "comprising" and modifications of these words are used in this description or the claims, these words intend to be comprehensive similar to the word "having". Furthermore, the word "or" used in this description or the claims intends not to be an XOR.

The present invention has been described in detail above. However, it is obvious for a person skilled in the art that the present invention is not limited to the embodiments described in this description. The present invention can be carried out as modified and changed aspects without departing from the gist and the scope of the present invention defined based on the recitation of the claims. Accordingly, the disclosure of this description is intended for exemplary explanation, and does not bring any restrictive meaning to the present invention.

The invention claimed is:

1. A terminal comprising:
a processor that determines, based on a subcarrier spacing, a physical resource block index within a bandwidth and determines a value indicating a cyclic shift, based on the physical resource block index and a symbol number that are used for a physical uplink control channel (PUCCH) transmitted on two or less symbols, by using a calculation formula including the physical resource block index and the symbol number; and
a transmitter that transmits the PUCCH by using the value indicating the cyclic shift,
wherein
a number of bits of at least one of a scheduling request (SR) and a hybrid automatic repeat request-acknowledgement (HARQ-ACK) transmitted on the PUCCH is two or less.

2. The terminal according to claim 1, further comprising a receiver that receives, by higher layer signaling, information related to the value indicating the cyclic shift.

3. A radio communication method for a terminal, the method comprising:
determining, based on a subcarrier spacing, a physical resource block index within a bandwidth and determining a value indicating a cyclic shift, based on the physical resource block index and a symbol number that are used for a physical uplink control channel (PUCCH) transmitted on two or less symbols, by using a calculation formula including the physical resource block index and the symbol number; and
transmitting the PUCCH by using the value indicating the cyclic shift,
wherein
a number of bits of at least one of a scheduling request (SR) and a hybrid automatic repeat request-acknowledgement (HARQ-ACK) transmitted on the PUCCH is two or less.

4. A system comprising:
a terminal and a base station, wherein
the terminal comprises:
a processor that determines, based on a subcarrier spacing, a physical resource block index within a bandwidth and determines a value indicating a cyclic shift, based on the physical resource block index and a symbol number that are used for a physical uplink control channel (PUCCH) transmitted on two or less symbols, by using a calculation formula including the physical resource block index and the symbol number; and
a transmitter that transmits the PUCCH by using the value indicating the cyclic shift, and
the base station comprises:
a receiver that receives the PUCCH,
wherein
a number of bits of at least one of a scheduling request (SR) and a hybrid automatic repeat request-acknowledgement (HARQ-ACK) transmitted on the PUCCH is two or less.

* * * * *